# United States Patent [19]

Kimmel

[11] 3,959,777
[45] May 25, 1976

[54] DATA PROCESSOR FOR PATTERN RECOGNITION AND THE LIKE

[75] Inventor: Milton Jay Kimmel, Rochester, Minn.

[73] Assignee: International Business Machines Corporation, Armonk, N.Y.

[22] Filed: July 17, 1972

[21] Appl. No.: 272,698

[52] U.S. Cl. .............................................. 340/172.5
[51] Int. Cl.² ........................ G06F 9/20; G06F 9/10; G06F 9/14
[58] Field of Search .............................. 340/172.5

[56] References Cited
UNITED STATES PATENTS

| | | | |
|---|---|---|---|
| 3,391,394 | 7/1968 | Ottaway et al. | 340/172.5 |
| 3,408,630 | 10/1968 | Packard et al. | 340/172.5 |
| 3,418,638 | 12/1968 | Anderson et al. | 340/172.5 |
| 3,551,895 | 12/1970 | Driscoll | 340/172.5 |
| 3,553,655 | 1/1971 | Anderson et al. | 340/172.5 |
| 3,571,808 | 2/1972 | Washizuka et al. | 340/172.5 |
| 3,573,853 | 4/1971 | Watson et al. | 340/172.5 |
| 3,573,854 | 4/1971 | Watson et al. | 340/172.5 |
| 3,577,189 | 5/1971 | Cocke et al. | 340/172.5 |
| 3,599,176 | 8/1971 | Cordero et al. | 340/172.5 |
| 3,614,747 | 10/1971 | Ishihara et al. | 340/172.5 |
| 3,629,853 | 12/1971 | Newton | 340/172.5 |
| 3,634,883 | 1/1972 | Kreidermacher | 340/172.5 |
| 3,641,508 | 2/1972 | Saltini | 340/172.5 |
| 3,659,274 | 4/1972 | Kyser | 340/172.5 |
| 3,689,895 | 9/1972 | Kitamura | 340/172.5 |
| 3,696,340 | 10/1972 | Matsushita et al. | 340/172.5 |
| 3,699,526 | 10/1972 | Iskiyan et al. | 340/172.5 |
| 3,704,448 | 11/1972 | Osborne | 340/172.5 |
| 3,713,108 | 1/1973 | Edstrom et al. | 340/172.5 |
| 3,728,686 | 4/1973 | Weisbecker | 340/172.5 |
| 3,754,218 | 8/1973 | Hatta et al. | 340/172.5 |
| 3,764,988 | 10/1973 | Onishi | 340/172.5 |
| 3,771,138 | 11/1973 | Celtruda et al. | 340/172.5 |
| 3,771,140 | 11/1973 | Tromp | 340/172.5 |

Primary Examiner—Raulfe B. Zache
Assistant Examiner—Jan E. Rhoads
Attorney, Agent, or Firm—J. Michael Anglin

[57] ABSTRACT

A data-processing system for pattern recognition and the like, having an instruction unit (IU) for storing, decoding and modifying instructions, and an execution unit (EU) for storing and performing operations on data. The IU has facilities for making a branch address effective for a plurality of subsequent instructions, and for masking and de-conditioning the prospective branch. The IU also indexes data-operand addresses according to a variable modulus. The EU performs Boolean and voting logic functions in a series of cascaded registers. The EU controls the acquisition of external data according to the type of instruction being executed, and maintains a record of the location of data strings in memory. Intermediate computational results are automatically placed in a hardware stack without any programming overhead. Bits from multiple operands are placed in a single operand byte by shift-load instructions.

14 Claims, 16 Drawing Figures

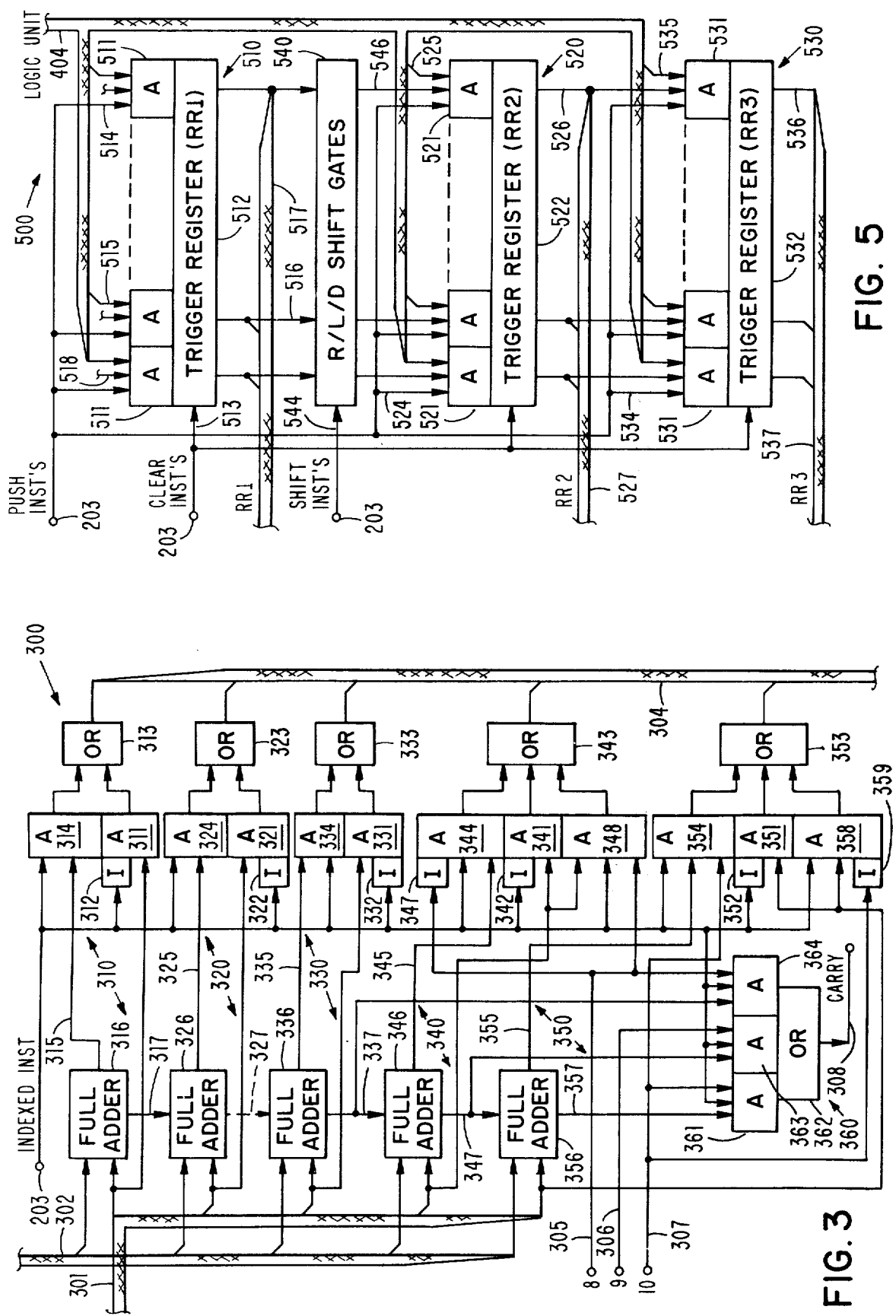

*COMMON FUNCTIONS*

*THESE ROUTINES ARE COMMONLY USED WITHIN MANY INSTRUCTIONS.*

```
∇ FETCH
  POR←PSM[2⊥PAR;]
  OPR←POR[ι8]
∇

∇ Z←X PLUS Y
  Z←(10ρ2)⊤(2⊥X)+2⊥Y
∇

∇ NOINDEX
  SR←POR[6+ι10]
  DAR←H,SR
∇

∇ INDEX
  SR[0 1]←POR[6 7]
  SR[(10-NB)+ιNB]←(NBρ2)⊤(2⊥POR[
     (16-NB)+ιNB])+2⊥XR[(10-NB)+ιNB]
  DAR←H,SR
∇

∇ DFETCH
  DOR←DSM[2⊥DAR;]
∇

∇ DSTORE X
  DIR←X
  DSM[2⊥DAR;]←DIR
∇

∇ NEXT
  →(B=1)/BRANCH
  SEQUENTIAL:PAR[4+ι12]←(12ρ2)⊤
     1+2⊥PAR[4+ι12]
  →END
  BRANCH:PAR←BAR
  L←M←0
  END:B←0
∇
```

```
∇ VIDEO
  →((V=0)∨Q)/DONOTHING
  FEEDVIDEO:U←0
  DAR←BOT
  BOT[3+ι8]←(8ρ2)⊤(2⊥BOT[3+ι8])+1
  Q←∧/BOT=TOP
  DSTORE VR
  V←0
  DONOTHING:
∇

∇ PUSH X
  RR3←RR3∨RR2∧X
  RR2←RR2∨RR1∧X
  RR2←RR1∨X
∇

∇ RESET
  RR3←RR2←8ρ0
∇

∇ STACKIN X
  →D=1/STACKEND
  DEQUALSO:SAR←(4ρ2)⊤1+2⊥SAR
  DIR←X
  SSM[SAR;]←DIR
  STACKEND:D←0
∇

∇ Z←STACKOUT
  Z←SSM[SAR;]
  SAR←(4ρ2)⊤(2⊥SAR)-1
∇

∇ INITIALIZATION
  D←U←Q←V←B←L←M←0
  H←0
  C← 0 0
  NB←8
∇

∇ Z←WHITEFILL
  WC←(1,NBρ0)/((NB+1)ρ2)⊤(2⊥XR[
     (10-NB)+ιNB])+2⊥POR[(16-NB)+ιNB]
  Z←8ρ~(W[0]∧~WC)∨W[1]∧WC
∇
```

FIG. 7

INSTRUCTIONS

SEE COMMON FUNCTIONS FOR ROUTINES USED WITHIN INSTRUCTIONS.

AND

```
∇ A
  FETCH
  NOINDEX
  DFETCH
  RR2←RR1
  RR1←RR2∧DOR
  B←M∧~v/RR2∧DOR
  RESET
  D←0
  NEXT
∇
```

ARITHMETIC ADD

```
∇ AA
  FETCH
  SR←POR[8+ι8] PLUS FOR[2+ι8]
  B←M∧SR[1]
  RR1←SR[2+ι8]
  VIDEO
  NEXT
∇
```

AND COMPLEMENT

```
∇ AC
  FETCH
  NOINDEX
  DFETCH
  RR2←RR1
  RR1←RR2∧~DOR
  B←M∧~v/RR2∧~DOR
  RESET
  D←0
  NEXT
∇
```

AND COMPLEMENT INDEXED

```
∇ ACX
  FETCH
  INDEX
  DFETCH
  RR2←RR1
  RR1←RR2∧~DOR∧WHITEFILL
  B←M∧~v/RR2∧~DOR∧WHITEFILL
  RESET
  D←0
  NEXT
∇
```

ADD

```
∇ ADD
  FETCH
  SR←RR2 PLUS (FOR [2+ι8] PLUS POR [ι2])
  RR1←SR[2+ι8]
  B←M∧POR[15]∧SR[1]
  Z←(0,0,1,7ρ0)/(RR2[1+ι7] PLUS
     (FOR [3+ι7] PLUS POR [ι2]))
  B←BvM∧POR[14]∧Z
  B←BvM∧POR[13]∧SR[1]≠Z
  VIDEO
  NEXT
∇
```

AND MASK NOT ZERO

```
∇ AMNZ
  FETCH
  RR2←RR1
  B←M∧v/RR2∧POR[8+ι8]
  RR1←RR2∧POR[8+ι8]v8ρM
  VIDEO
  NEXT
∇
```

AND MASK ZERO

```
∇ AMZ
  FETCH
  RR2←RR1
  B←M∧~v/RR2∧POR[8+ι8]
  RR1←RR2∧POR[8+ι8]v8ρM
  VIDEO
  NEXT
∇
```

AND STACK

```
∇ AS
  FETCH
  RR2←RR1
  RR1←RR2∧STACKOUT
  M←MvL∧0=v/SAR
  B←M∧~v/RR1
  VIDEO
  RESET
  D←0
  NEXT
∇
```

FIG. 7a

AND_STACK_COMPLEMENTED

```
∇ ASC
  FETCH
  RR2←RR1
  RR1←RR2∧~STACKOUT
  M←M∨L∧0=∨/SAR
  B←M∧~∨/RR1
  VIDEO
  RESET
  D←0
  NEXT
∇
```

AND_INDEXED

```
∇ AX
  FETCH
  INDEX
  DFETCH
  RR2←RR1
  RR1←RR1∧DOR∧WHITEFILL
  B←M∧~∨/RR2∧DOR∧WHITEFILL
  RESET
  D←0
  NEXT
∇
```

BRANCH

```
∇ B
  FETCH
  B←1
  L←M←0
  BAR[4+ι12]←POR[4+ι12]
  VIDEO
  NEXT
∇
```

BRANCH_AND_LINK

```
∇ BAL
  FETCH
  B←1
  L←M←0
  BAR[4+ι12]←POR[4+ι12]
  BLR←(16ρ2)⊤1+2⊥PAR
  VIDEO
  NEXT
∇
```

CONDITION_BRANCH

```
∇ CB
  FETCH
  L←M←1
  BAR[4+ι12]←POR[4+ι12]
  VIDEO
  SAR←4ρ0
  NEXT
∇
```

COMPARE_MASK_EQUAL

```
∇ CME
  FETCH
  RR2←RR1
  B←M∧∧/RR2=POR[8+ι8]
  RR1←((8ρ~M)∧RR2=POR[8+ι8])∨(RR2∧8ρM)
  VIDEO
  NEXT
∇
```

COMPARE_MASK_NOT_EQUAL

```
∇ CMNE
  FETCH
  RR2←RR1
  B←M∧∨/RR2≠POR[8+ι8]
  RR1←((8ρ~M)∧RR2≠POR[8+ι8])∨(RR2∧8ρM)
  VIDEO
  NEXT
∇
```

FETCH

```
∇ F
  FETCH
  NOINDEX
  DFETCH
  POR[2+ι8]←DOR
  RR2←RR1
  NEXT
∇
```

FETCH_HIGH

```
∇ FH
  NOINDEX
  DFETCH
  POR[0,1]←DOR[6,7]
  RR2←RR1
  NEXT
∇
```

HALT

```
∇ HALT
  FETCH
∇
```

LOAD

```
∇ L
  FETCH
  M←0
  NOINDEX
  DFETCH
  RESET
  STACKIN RR1
  RR1←DOR
  NEXT
∇
```

FIG. 7b

LOAD_BRANCH_ADDRESS_LOW_AND_BRANCH

```
∇ LBB
   FETCH
   B←1
   L←M←0
   NOINDEX
   DFETCH
   BAR[8+ι8]←FOR[2+ι8]←DOR
   NEXT
∇
```

LOAD_BRANCH_ADDRESS_HIGH

```
∇ LBH
   FETCH
   NOINDEX
   DFETCH
   BAR[ι8]←FOR[2+ι8]←DOR
   NEXT
∇
```

LOAD_COMPLEMENT

```
∇ LC
   FETCH
   M←0
   NOINDEX
   DFETCH
   RESET
   STACKIN RR1
   RR1←~DOR
   NEXT
∇
```

LOAD_COMPLEMENT_INDEXED

```
∇ LCX
   FETCH
   M←0
   INDEX
   DFETCH
   RESET
   STACKIN RR1
   RR1←~DOR∧WHITEFILL
   NEXT
∇
```

LINK

```
∇ LK
   FETCH
   L←M←0
   PAR←BLR
   VIDEO
∇
```

LINK_CONDITION

```
∇ LKC
   FETCH
   L←M←0
   PAR←BLR
   VIDEO
   →(0=∨/RR1)/∇
   NEXT
∇
```

SHIFT_RIGHT_LOAD_LEFT_INDEXED_(N)

```
∇ LLX(N)
   FETCH
   L←M←0
   N←2×(POR[5]+2×POR[4])
   INDEX
   DFETCH
   RESET
   RR2←RR1[(8-N)+ιN],RR1[ι8-N]
   RR1←DOR[ιN],RR2[N+ι8-N]
   NEXT
∇
```

SHIFT_RIGHT_LOAD_LEFT_(N)

```
∇ LL(N)
   FETCH
   L←M←0
   N←2×(POR[5]+2×POR[4])
   NOINDEX
   DFETCH
   RESET
   RR2←RR1[(8-N)+ιN],RR1[ι8-N]
   RR1←DOR[ιN],RR2[N+ι8-N]
   NEXT
∇
```

SHIFT_RIGHT_LOAD_LEFT_(N)_FROM_STACK

```
∇ LL(N)S
   FETCH
   L←M←0
   N←2×(POR[5]+2×POR[4])
   RESET
   RR2←RR1[(8-N)+ιN],RR1[ι8-N]
   RR1←STACKOUT[ιN],RR2[N+ι8-N]
   VIDEO
   NEXT
∇
```

FIG. 7c

SHIFT_LEFT_LOAD_RIGHT_INDEXED_(N)

```
∇ LRX(N)
  FETCH
  L←M←0
  N←2×(POR[5]+2×POR[4])
  INDEX
  DFETCH
  RESET
  RR2←RR1[N+ι8-N],RR1[ιN]
  RR1←RR2[ι8-N],DOR[(8-N)+ιN]
  NEXT
∇
```

SHIFT_LEFT_LOAD_RIGHT_(N)

```
∇ LR(N)
  FETCH
  L←M←0
  N←2×(POR[5]+2×POR[4])
  NOINDEX
  DFETCH
  RESET
  RR2←RR1[N+ι8-N],RR1[ιN]
  RR1←RR1[ι8-N],DOR[(8-N)+ιN]
  NEXT
∇
```

SHIFT_LEFT_LOAD_RIGHT_(N)_FROM_STACK

```
∇ LR(N)S
  FETCH
  L←M←0
  N←2×(POR[5]+2×POR[4])
  RESET
  RR2←RR1[N+ι8-N],RR1[ιN]
  RR1←RR2[ι8-N],STACKOUT[(8-N)+ιN]
  VIDEO
  NEXT
∇
```

LOAD_FROM_STACK

```
∇ LS
  FETCH
  M←0
  RR1←STACKOUT
  RESET
  D←0
  VIDEO
  NEXT
∇
```

LOAD_FROM_STACK_COMPLEMENTED

```
∇ LSC
  FETCH
  M←0
  RR1←~STACKOUT
  RESET
  D←0
  VIDEO
  NEXT
∇
```

LOAD_VIDEO

```
∇ LV
  FETCH
  →((M∧U)=1)/BYPASS
  DAR←TOP
  TOP[3+ι8]←(8ρ2)⊤[2⊥TOP[3+ι8]]+1
  U←∧/TOP=BOT
  Q←0
  DFETCH
  RESET
  RR1←DOR
  →FINISH
  BYPASS:B←1
  VIDEO
  FINISH:L←M←0
  NEXT
∇
```

LOAD_INDEXED

```
∇ LX
  FETCH
  M←0
  INDEX
  DFETCH
  RESET
  STACKIN RR1
  RR1←DOR∧WHITEFILL
  NEXT
∇
```

LOAD_INDEX_REGISTER

```
∇ LXR
  FETCH
  L←M←0
  SR←POR[8+ι8] PLUS FOR
  XR[(10-NB)+ιNB]←SR[(10-NB)+ιNB]
  VIDEO
  NEXT
∇
```

*MOVE_INDEX_REGISTER*

```
∇ MXR
  FETCH
  SR←POR[8+ι8] PLUS XR
  RR1←SR[2+ι8]
  B←M∧(0,1,8ρ0)/POR[8+ι8] PLUS XR
  XR[10-NB)+ιNB]←SR[(10-NB)+ιNB]
  VIDEO
  NEXT
∇
```

*NO_OPERATION*

```
∇ NOOP
  FETCH
  VIDEO
  NEXT
∇
```

*OR*

```
∇ O
  FETCH
  NOINDEX
  DFETCH
  RR2←RR1
  RR1←RR2∨DOR
  B←M∧∧/RR2∨DOR
  RESET
  D←0
  NEXT
∇
```

*OR_COMPLEMENT*

```
∇ OC
  FETCH
  NOINDEX
  DFETCH
  RR2←RR1
  RR1←RR2∨~DOR
  B←M∧∧/RR2∨~DOR
  RESET
  D←0
  NEXT
∇
```

*OR_COMPLEMENT_INDEXED*

```
∇ OCX
  FETCH
  INDEX
  DFETCH
  RR2←RR1
  RR1←RR2∨~DOR∧WHITEFILL
  B←M∧∧/RR2∨~DOR∧WHITEFILL
  RESET
  D←0
  NEXT
∇
```

*OR_MASK_NOT_ONES*

```
∇ OMNO
  FETCH
  RR2←RR1
  B←M∧~∧/RR2∨POR[8+ι8]
  RR1←RR2∨POR[8+ι8]∧8ρ~M
  VIDEO
  NEXT
∇
```

*OR_MASK_ONES*

```
∇ OMO
  FETCH
  RR2←RR1
  B←M∧∧/RR2∨POR[8+ι8]
  RR1←RR2∨POR[8+ι8]∧8ρ~M
  VIDEO
  NEXT
∇
```

*OR_STACK*

```
∇ OS
  FETCH
  RR2←RR1
  RR1←RR2∨STACKOUT
  M←M∨L∧0=∨/SAR
  B←M∧∧/RR1
  VIDEO
  RESET
  D←0
  NEXT
∇
```

*OR_STACK_COMPLEMENTED*

```
∇ OSC
  FETCH
  RR2←RR1
  RR1←RR2∨~STACKOUT
  M←M∨L∧0=∨/SAR
  B←M∧∧/RR1
  VIDEO
  RESET
  D←0
  NEXT
∇
```

*OR_INDEXED*

```
∇ OX
  FETCH
  INDEX
  DFETCH
  RR2←RR1
  RR1←RR2∨DOR∧WHITEFILL
  B←M∧∧/RR2∨DOR∧WHITEFILL
  RESET
  D←0
  NEXT
∇
```

FIG. 7e

PUSH

∇ P
  FETCH
  M←0
  NOINDEX
  DFETCH
  PUSH DOR
  D←0
  NEXT
∇

PUSH_COMPLEMENT

∇ PC
  FETCH
  M←0
  NOINDEX
  DFETCH
  PUSH ~DOR
  D←0
  NEXT
∇

PUSH_COMPLEMENT_INDEXED

∇ PCX
  FETCH
  M←0
  INDEX
  DFETCH
  PUSH ~DOR∧WHITEFILL
  D←0
  NEXT
∇

PUSH_FROM_STACK

∇ PS
  FETCH
  M←0
  PUSH STACKOUT
  VIDEO
  D←0
  NEXT
∇

PUSH_FROM_STACK_COMPLEMENTED

∇ PSC
  FETCH
  M←0
  PUSH ~STACKOUT
  VIDEO
  D←0
  NEXT
∇

PUSH_INDEXED

∇ PX
  FETCH
  M←0
  INDEX
  DFETCH
  PUSH DOR∧WHITEFILL
  D←0
  NEXT
∇

EQUALS

∇ Q
  FETCH
  NOINDEX
  DFETCH
  RR2←RR1
  RR1←RR2≠~DOR
  B←M∧∧/RR2≠~DOR
  RESET
  D←0
  NEXT
∇

EQUALS_FROM_STACK

∇ QS
  FETCH
  RR2←RR1
  RR1←RR2≠~STACKOUT
  M←M∨L∧0=∨/SAR
  B←M∧∧/RR1
  VIDEO
  RESET
  D←0
  NEXT
∇

EQUALS_INDEXED

∇ QX
  FETCH
  INDEX
  DFETCH
  RR2←RR1
  RR1←RR2≠~DOR∧WHITEFILL
  B←M∧∧/RR2≠~DOR∧WHITEFILL
  RESET
  D←0
  NEXT
∇

FIG. 7f

READ

∇ READ
  FETCH
  L←M←0
  RR1←EX[2⊥POR[8+ι8];]
  RESET
  VIDEO
  NEXT
∇

STORE_RESULT

∇ S
  FETCH
  L←M←0
  NOINDEX
  DSTORE RR1
  D←1
  NEXT
∇

SET_ADDRESSING_STATUS

∇ SAS
  FETCH
  H←POR[15]
  VIDEO
  NEXT
∇

SHIFT_LEFT_STORE_STACK

∇ SLS
  FETCH
  L←M←0
  RR1←RR1[1+ι7],RR1[0]
  D←0
  STACKIN RR1
  D←1
  NEXT
∇

SHIFT_RIGHT_STORE_STACK

∇ SRS
  FETCH
  L←M←0
  RR1←RR1[7],RR1[ι7]
  D←0
  STACKIN RR1
  D←1
  NEXT
∇

STORE_RESULT_IN_STACK

∇ SS
  FETCH
  M←0
  D←0
  STACKIN RR1
  D←1
  NEXT
∇

STORE_RESULT_INDEXED

∇ SX
  FETCH
  L←M←0
  INDEX
  DSTORE RR1
  D←1
  NEXT
∇

SET_INDEXING_STATUS

∇ SXS
  FETCH
  L←M←0
  C←POR[14,15]
  NB←8+(2⊥C)
  W←POR[10,11]
  VIDEO
  NEXT
∇

STORE_MAJORITY_2

∇ S2
  FETCH
  L←M←0
  NOINDEX
  D←1
  DSTORE RR2
  NEXT
∇

STORE_MAJORITY_2_IN_STACK

∇ S2S
  FETCH
  M←0
  D←0
  STACKIN RR2
  D←1
  NEXT
∇

FIG. 7g

STORE_MAJORITY_2_INDEXED

```
∇ S2X
  FETCH
  L←M←0
  INDEX
  DSTORE RR2
  D←1
  NEXT
∇
```

STORE_MAJORITY_3

```
∇ S3
  FETCH
  L←M←0
  NOINDEX
  DSTORE RR3
  D←1
  NEXT
∇
```

STORE_MAJORITY_3_IN_STACK

```
∇ S3S
  FETCH
  M←0
  D←0
  STACKIN RR3
  D←1
  NEXT
∇
```

TEST_ONE_INDEXED

```
∇ TOX
  FETCH
  INDEX
  DFETCH
  B←M∧(1,7ρ0)/DOR∧WHITEFILL
  NEXT
∇
```

TEST_ONE_INDEXED,_LINK

```
∇ TOXL
  FETCH
  INDEX
  DFETCH
  B←M∧A←(1,7ρ0)/DOR∧WHITEFILL
  →(A=1)/NXT
  L←M←0
  PAR←BLR
  →∇
  NXT: NEXT
∇
```

TEST_ZERO_INDEXED

```
∇ TZX
  FETCH
  INDEX
  DFETCH
  B←M∧~(1,7ρ0)/DOR∧WHITEFILL
  NEXT
∇
```

TEST_ZERO_INDEXED,_LINK

```
∇ TZXL
  FETCH
  INDEX
  DFETCH
  B←M∧A←~(1,7ρ0)/DOR∧WHITEFILL
  →(A=1)/NXT
  L←M←0
  PAR←BLR
  →∇
  NXT: NEXT
∇
```

WRITE

```
∇ WRT
  FETCH
  L←M←0
  EX[2↓POR[8+ι8];]←RR1
  VIDEO
  NEXT
∇
```

EXCLUSIVE_OR

```
∇ XOR
  FETCH
  NOINDEX
  DFETCH
  RR2←RR1
  RR1←RR2≠DOR
  B←M∧~∨/RR2≠DOR
  RESET
  D←0
  NEXT
∇
```

EXCLUSIVE_OR_FROM_STACK

```
∇ XORS
  FETCH
  RR2←RR1
  RR1←RR2≠STACKOUT
  M←M∨L∧0=∨/SAR
  B←M∧~∨/RR1
  VIDEO
  RESET
  D←0
  NEXT
∇
```

FIG. 7h

EXCLUSIVE_OR_INDEXED

```
∇ XORX
  FETCH
  INDEX
  DFETCH
  RR2←RR1
  RR1←RR2≠DOR∧WHITEFILL
  B←M∧~∨/RR2≠DOR∧WHITEFILL
  RESET
  D←0
  NEXT
∇
```

INITIALIZE_BRANCH_ADDRESS_HIGH

```
∇ ZBH
  FETCH
  BAR[ι8]←POR[8+ι8]
  VIDEO
  NEXT
∇
```

INITIALIZE_RESULT_REGISTER_ONE

```
∇ ZR
  FETCH
  M←L←0
  RESET
  RR1←POR[8+ι8]
  D←0
  VIDEO
  NEXT
∇
```

INITIALIZE_TOP_AND_BOTTOM

```
∇ ZTB
  FETCH
  L←M←0
  TOP←POR[8+ι4],7ρ0
  BOT←POR[12+ι4],7ρ0
  Q←V←0
  U←∧/TOP=BOT
  NEXT
∇
```

INITIALIZE_INDEX_REGISTER

```
∇ ZXR
  FETCH
  L←M←0
  XR←0,0,POR[8+ι8]
  VIDEO
  NEXT
∇
```

DATA PROCESSOR FOR PATTERN RECOGNITION AND THE LIKE

BACKROUND OF THE INVENTION

The present invention relates to electronic data processing, and specifically concerns an improved data processor for pattern recognition and similar functions.

Present-day commercial machines for recognizing printed characters and other patterns are almost invariably implemented in the form of hardwired logic. General-purpose computers have been employed for many years for experimental and low-volume recognition, such as the design and simulation of character-recognition algorithms and the analysis of spacecraft photographs. The implementation of recognition functions in software form has many advantages: algorithms may be modified or replaced easily; the same hardware may be used for several different functions, to minimize idle time; and the hardware and software are separately diagnosable, to name only a few. These advantages of course also apply to areas other than pattern recognition, and there is presently a trend toward the implementation of many different types of previously hardwired functions in small, programmed data processors.

The major obstacle to the use of software recognition techniques in a commercial environment is speed. Since the circuits in a hard-wired machine can operate in parallel, presently available OCR (optical character recognition) and MICR (magnetic-ink character recognition) machines are capable of processing a thousand or more characters per second. Execution of the same algorithms on a conventional general-purpose computer, however, would lower this rate to the range of ten to one hundred per second. Careful and ingenious programming will increase this rate to some extent, but at the expense of greatly increased design time and at the limitation to a small number of efficiently codable recognition techniques. The addition of special-purpose recognition micro-instructions for a general-purpose computer has also been proposed. This system is shown in co-owned U.S. patent application Ser. No. 95,676 While it achieves speeds generally comparable to those of hardware-oriented recognition systems, it requires micro-instruction storage space which is always at a premium, it must be made less efficient in order to conform to architectural standards defined for other purposes, and it is limited to the implementation of a specific type of recognition algorithm.

What is required, then, is a "general-purpose" special-purpose recognition processor: a data processor which is special-purpose in that it is optimized to perform recognition and allied functions efficiently, yet which is general-purpose in that it is capable of implementing a wide range of recognition algorithms plus a number of other tasks, such as machine control, data management, and so forth.

SUMMARY OF THE INVENTION

The present invention proposes an electronic data processor capable of efficiently executing a wide variety of pattern-recognition and other functions. The processor is small, inexpensive, fast and requires a relatively small amount of storage for data and instructions.

Briefly, the present invention achieves the above and other advantages by providing facilities for the conditioning of prospective branching, for automatic intermediate-result storage and data entry, for the rapid execution of voting logic and multiple-operand functions, and for selecting data operands from particular areas of data storage.

Conditional branching is performed under program control during the execution of instructions subsequent to the conditioning instruction. The condition which causes the previously specified branch address to become effective is implicit in the subsequent instructions, and is different for different instructions. Certain instructions are capable of masking a branch address until it is unmasked by another instruction. Still other instructions cause a previous branch address to be effectively erased for all following instructions.

A stack storage is associated with control logic to store intermediate computational data from a result register. Data are explicitly removed from the stack and may also be entered by explicit instructions. The contents of the result register are automatically entered into the stack whenever an instruction attempts to overwrite the register contents, unless a previous instruction had already moved that data to a storage location.

Asynchronous data from an input register is stored in an internal memory under the control of logic which senses those instructions which do not require the accessing of that memory. Data are automatically entered in a queue whose end points are recorded, and the logic prevents the memory from overfilling and from accessing data from an empty queue.

Voting-logic functions are performed by entering successive operands into a register and pushing a logic function of these operands into a plurality of further registers whenever each operand has a certain value. The function is then obtained by selectively gatting the output of one of the registers.

Multiple operands representing corresponding data from different input patterns may be processed concurrently by simultaneous shifting and loading. A portion of a first operand is selected and interchanged with another portion as the entire operand is moved to a second register. A portion of a second operand overwrites the selected portion of the first operand in the first register.

Operands are called from particular blocks of data storage by selectively enabling a predetermined number of ordered units in a function generator, and entering both an index quantity and an operand address into the generator. The function generated by the enabled stages is then used to access an operand from the data storage.

DRAWINGS

FIG. 3 shows the index unit 300 of FIG. 2.

FIG. 5 shows the details of the result-register unit 500 of FIG. 2.

Figure 2:
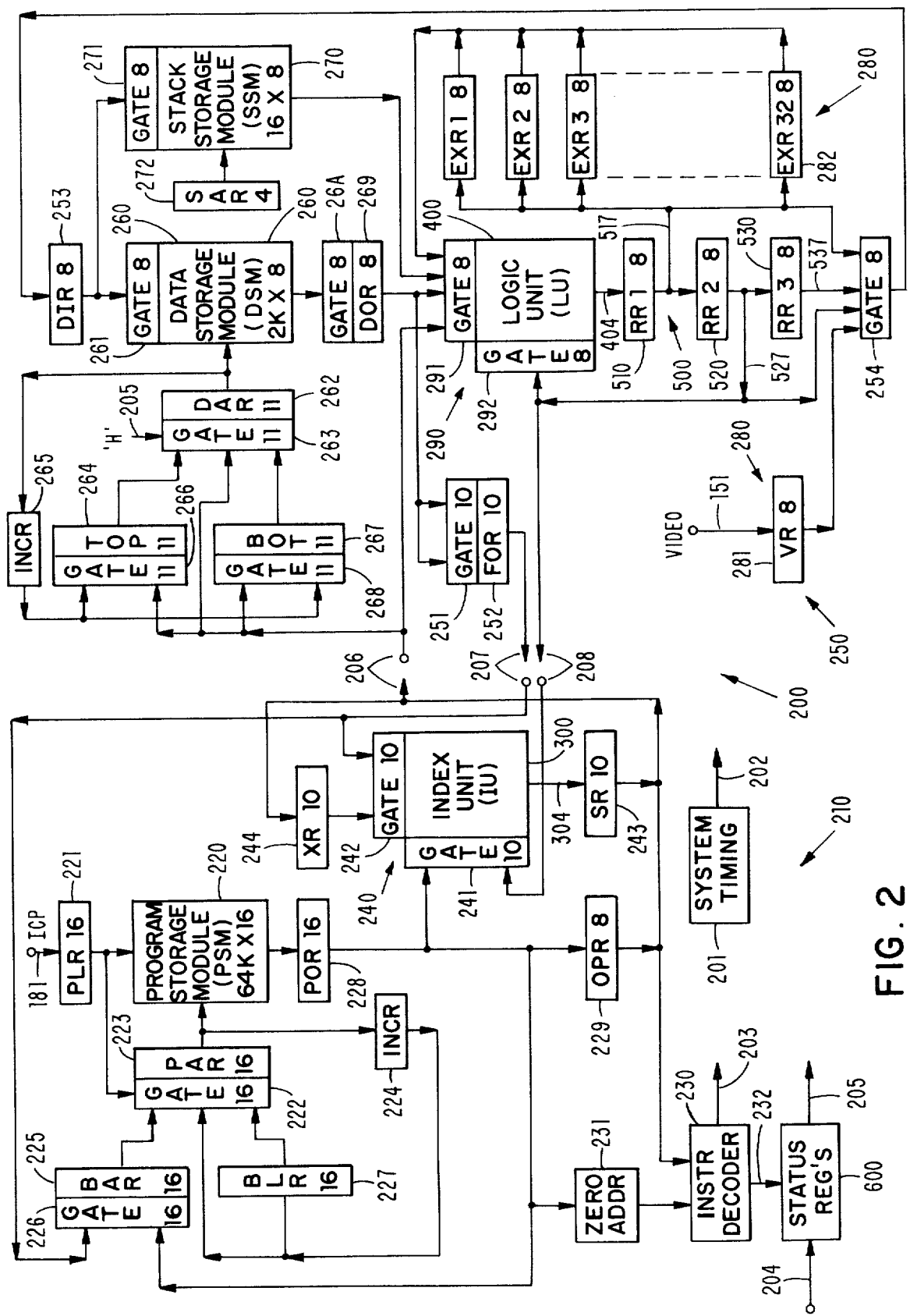
FIG. 2 is a data-flow diagram of a data processor 200 according to the invention.

FIG. 7 describes a set of common functions used to implement the instruction set for the processor of FIG. 2.

FIGS. 7a and 7i describe the control logic, including the common functions of FIG. 7, of the individual instructions for the processor of FIG. 2.

DETAILED DESCRIPTION OF THE EMBODIMENT

The following description proceeds from an outline of a typical recognition system using a programmed processor to a description of the entire data flow of the processor. Certain subunits of the processor are then explained in greater detail. The operations performed by each instruction in the processor's instruction set are then described, with particular emphasis on those instructions relevant to the invention. Finally, programming examples illustrate the use of the inventive concepts in representative applications.

Overall System

Figure 1:
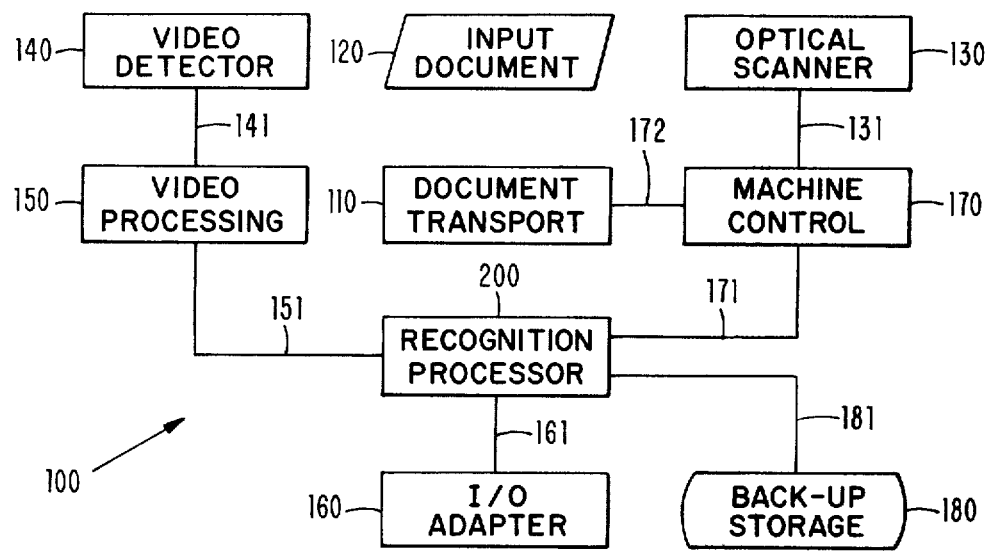
FIG. 1 is a simplified block diagram of one type of pattern-recognition system employing the present invention.

FIG. 1 shows a representative character recognition system 100. A conventional mechanical transport 110 moves a character-bearing input document 120 past an optical scanner 130. Scanner 130 may provide, for instance, a vertical raster scan sweeping over one line of characters on document 120. Video detector 140 receives reflected light from document 120 and converts it into an electrical signal representative of the light intensity reflected from document areas swept by the scanning beam. The signal on line 141 is conveniently digitized into black/white binary levels. It is also digitized in time, so that each binary signal or bit represents a predetermined size area or cell on document 120. Apparatus for carrying out each of the above functions is well known in the art. Other types of input devices, such as parallel optical detector arrays, magnetic scanners, acoustic transducers or instrumentation outputs, may also be used in the present system.

Video processing unit 150 applies certain conventional preliminary transformations to the signal on line 141. If system 100 is designed to recognize machine-printed or hand-printed characters, such functions may include electronic storage of character images, character size normalization and position registration, and segmentation of adjacent characters. Circuitry for performing these functions is well known in the art, and may be of any suitable form. Output line 151 carries the transformed or "preprocessed" signal to processor 200 for recognition of its identity. Input/output adapter 160 receives an identification code signal from processor 200, and transmits it to a computer (not shown) or to any other suitable output device.

Although the primary task of unit 200 is to process input signals for recognition purposes, it also performs several other functions in system 100. Machine-control circuits 170, for instance, may receive condition signals from transport 110, relay them to processor 200, receive control signals back from processor 200, and transmit them to actuators for controlling the operation of the transport. Processor 200 may also receive control signals from an external device through I/O adapter 160. One conventional use of such external control signals is to provide further control of transport 110, such as selecting a particular stacker for document 120. Such signals may also be passed through mcahine control circuits 170 to optical scanner 130, for formatting purposes. That is, it is frequently desirable to allow an external device to select only certain parts of document 120 for scanning.

Back-up storage unit 180 holds several types of programs for recognition, machine control and diagnostics which cannot be simultaneously stored in the internal memories of the processor. The provision of storage 180 allows system 100 to operate off-line from a host central processing unit (CPU), or to make minimal demands upon the host CPU memory when it is operated online. Unit 180 may be a small disk drive or other form of conventional bulk memory.

Processor Configuration

FIG. 2 is a data-flow diagram of processor 200. Before proceeding with a detailed description of FIG. 2, it may be helpful to explain certain conventions used therein. Each block in FIG. 2 contains either the full or an abbreviated name of a hardware unit represented by the block. This name, such as "BAR", "PLR" and "Program Storage Module (PSM)", appears at either the left side or the top of the associated block. Most blocks also contain a number at either the right side or the bottom of the block, representing the size of that block. The number "16" in the block labelled "BAR", for instance, indicates that that block is 16 bits wide. The number "64K × 16" in the program storage module block indicates that the capacity of this block is 64K (actually 65,536) words of 16 bits each. The lines between the blocks in FIG. 2 represent unidirectional data paths, each of which may carry multiple bits in parallel. The direction data flow is shown by the arrows. Each block labelled "GATE" in FIG. 2 is capable of switching one or more data lines into the block below it or to its right. Such gates are common and well known in digital data processing equipment. To avoid undue complication in the description, the wiring for controlling the individual gates has been omitted from FIG. 2. Details of the gate-control functions will, however, be described hereinbelow.

Processor 200 is organized in two major subsections, an instruction unit 210 and an execution unit 250. Instruction unit 210 contains facilities for storing, interpreting and indexing program instructions; it has a relatively large amount of storage and wide data paths. Execution unit 250 includes components for receiving, storing and outputting data operands, and for executing logic functions. It contains smaller, faster storage facilities, and has narrower data paths. Timing unit 201 generates system timing signals and provides conventional synchronization for the various units of processor 200, over lines 202.

Instruction unit 210 is built around a program storage module (PSM) 220, an instruction decoder 230, a bank of status registers 600 and an index module 240.

PSM 220 is an on-line storage module capable of containing a set of instructions for at least one program. It is here shown as having 65,536 words of sixteen bits each. With respect to the program instructions, PSM 220 appears to be a read-only memory; that is, no instruction in a program can directly modify the PSM contents. Program load register (PLR) 221, however, provides facilities for loading different programs from back-up storage 180, over line 181. PLR 221 also provides signals to gate 222 for initializing program address register (PAR) 223 while the program is being loaded. Control signals for program loading originate in an external device (not shown).

During execution of a program stored in PSM 220, addresses in PAR 223 may be derived from one of three sources, depending upon the setting of gate 222 by instruction decoder 230. For the execution of instructions in sequential locations of PSM 220, incrementor 224 adds a constant value (i.e., one) to the output of PAR 223 and returns it to one of the selectable inputs of gate 222. In order to modify this normal sequence of execution, branch address register (BAR) 225 may also be gated to PAR 223 through gate 222. It should be noted at this point that BAR 225 is capable of holding the single branch address throughout the execution of an indefinite number of other instructions. The importance of this fact will be explained at a later point. BAR gate 226 selects various portions of the branch address either from the program output register (POR) 228, or from fetch output register (FOR) 252 of execution unit 250, depending upon the type of instruction being executed. Thus, the branch address in BAR 225 may be specified in whole or in part by an instruction from PSM 220 and by the result of a computation in execution unit 250. The third source of addresses for PAR 223 is branch-and-link register (BLR) 227, which receives an output from incrementor 224 and which may be selectively transferred through gate 222 into PAR 223, to provide return linkages for subroutines.

POR 228 holds the current instruction which has been addressed by PAR 223. The eight most significant bits of the sixteen bits in POR 228 are transferred to operation code register (OPR) 229, although some of these bits are not decoded as operation codes for certain instructions. The least significant ten bits provide one of the inputs to index gate 241. Either eight or twelve bits of POR 228 are made available to BAR gate 226 for entry into selectable portions of BAR 225.

Instruction decoder 230 contains conventional forms of combinatorial and sequential logic for interpreting the operation codes stored in OPR 229. Output lines 203 then carry time control signals to the various gates of processor 200 for routing data through the appropriate paths at various times within an instruction execution cycle. Decoder 230 also produces output signals on lines 232 to status registers 600. Registers 600 also receive inputs over lines 204, from various units in processor 200, and produce output signals on lines 205, as will be described in connection with FIG. 6. Detector 231 detects all-zero operand addresses in POR 228, since these addresses modify the effect of certain instructions.

Index unit (IU) 300 of module 240 pprovides operand-address modification for indexed instructions. It also provides an arithmetic capability required by certain functions of the processor. Briefly, gates 241 and 242 each provide one operand to IU 300, which forms a variable-modulus sum in summation register (SR) 243. Gate 241 receives ten-bit operands from POR 228 and eight-bit operands from result register two (RR2) 520 of execution unit 250. Gate 242 receives inputs from index register (XR) 244, and from FOR 252 of the execution unit.

Execution unit 250 is organized around a data storage module (DSM) 260 and an associated stack storage module (SSM) 270, a set of input and output, or "external" registers (EXR) 280, a logic unit (LU) 400, and a set of result registers (RR) 500. These components are employed to receive, store and output system data, and to perform logic operations upon these data.

Data from data input register 253 may be gated into DSM by control signals transmitted to gate 261. Data address register (DAR) 262 contols the DSM location at which these data are stored; since DSM 260 has 2,048 8-bit locations, DAR 262 is 11 bits wide. The address in DAR 262 may be derived from several different sources, depending upon the setting of gate 263. The most significant bit ("H" bit) of this address is always derived from a line 205 from one of the status registers 600, as will be explained. Most instructions specify that the low-order 10 bits of the address are derived from SR 243, over line 206. These addresses are ultimately contained in instructions in POR 228, and are transferred to SR 243 either directly or in modified form by index module 240. Input data to processor 200 from external sources, however, are normally addressed as a queue in contiguous locations of an area of DSM 260. For this purpose, top register (TOP) 264 contains an address which is adjacent the address of that location which had last received a data byte. TOP 264 is updated by incrementor 265 via gate 266. Those instructions which have the effect of writing video data into DSM 260 (in a manner which will be detailed at a later point) also control gate 266 to place in TOP 264 the address which is next higher to that contained in DAR 262. TOP 264 may also be initialized from SR 243, by switching line 206 through gate 266. In a like manner, bottom register (BOT) 267 contains the address of the location adjacent the last data byte which had been read out of DSM 260. BOT 268 is updated by incrementor 265 during the execution of an instruction which reads video data from DSM 260. BOT 267 may also be initialized from SR 243 by switching line 206 through gate 268. Data are read out of DSM 260 into data output register (DOR) 269. Indexed instructions require that a string of zeros be supplied to DOR 269, regardless of the contents of the actual DSM location addressed by DAR 262, when certain conditions are fulfilled in the computation of a modified address by index unit 300. This effect is achieved by disabling gate 26A and resetting DOR 269 for those instructions.

The storage and use of intermediate computational results is facilitated by a stack storage module (SSM) 270 which is essentially parallel with DSM 260. Data are pushed into SSM 270 from DIR 253 by opening gate 271 while simultaneously closing gate 261, and thereafter incrementing stack address register (SAR) 272. Data are popped from SSM 270 through gate 291 and SAR 272 is then decremented. SSM 270 is capable of storing 16 8-bit bytes.

Communication from DSM 260 to instruction unit 210 is mediated by fetch output register (FOR) 252 and lines 207. Gate 251 assembles two consecutive 8-bit bytes into the 10-bit format required by instruction unit 210.

Logic module 290 performs one of a number of selectable operations upon data from gates 291 and 292, and enters the result in result register one (RR1) 510. One input to logic unit (LU) 400 is selected by gate 291 from SR 243, DOR 269, SSM 270, or one of the external registers (EXR) 280. The other input, when used, is obtained by gate 292 from result register two (RR2) 520. A byte from RR1 510 may be gated to either RR2 520 or to one of the EXR's 280. The selection of a particular EXR (such as EXR 32 282) for the receipt or transmission of a data byte is indicated by certain instruction bits from POR 228, and is performed in a conventional manner by selection logic associated with the EXR's. The contents of RR2 520 may be transmitted to IU 300 through gate 241, to LU 400 through gate 402 or to DIR 253 through gate 254 or in a modified form to result register three (RR3) 530. RR1 510 may also be gated directly to DIR 253 through gate 254. RR3 530 may be gated only to DIR 253, again through gate 254.

Gate 254 also controls the input of video data from line 151 into DIR 253, through an external register specialized for that purpose, the video register (VR) 281. The manner in which the loading of video data occurs during the execution of other instructions will be explained in connection with FIG. 6.

Index Unit

Index unit 300, FIG. 3., receives signals from gate 241 on lines 301 and signals from gate 242 on lines 302. When a signal on line 203 indicates that the operand address of an instruction is to be indexed, IU 300 produces a cyclic sum output on line 304. The modulus of the sum is variable, and is controlled by signals on lines 305, 306 and 307. Line 308 produces a carry signal indicating that the modulus selected by lines 305–307 has been exceeded during the summation operation.

The reference numerals 310, 320, 330, 340 and 350 respectively represent the first, second, eighth, ninth and tenth stages of a 10-bit adder network. The third through seventh stages of this network are identical to stages 310 and 320. A logic "zero" signal on line 203 indicates that the signal on line 301 is to be moved directly to output line 304, without indexing. Accordingly, a "zero" level on line 203 enables AND gates 311, 321, 331, 341 and 351 through inverters 312, 322, 332, 342 and 352, to pass the signals on lines 201 directly through OR gates 313, 323, 333, 343 and 353 to the corresponding output lines 304.

When line 203 carries a logic "one", AND gates 314, 324 and 334 transmit the sum outputs 315, 325 and 335 of conventional full adders 316, 326 and 336 through OR gates 313, 323 and 333 to output lines 304. Conventional interstage carry lines 317 and 327 are connected between the full adders, as in conventional practice.

A logic "one" signal on line 307 then indicates that the modulus of the sum signal on lines 304 is $2^{10}$, i.e., 1,024. (When any one of the lines 305–307 carries a "one", the other two are always at the "zero" level.) Under these conditions, the zero level on line 305 enables AND 344 through inverter 347 to transmit the sum output 345 of adder 346 through OR 343 to output lines 304. Line 307 enables AND 354 to pass the sum output 355 of adder 356 through OR 353 to the high-order position of lines 304. Line 307 also enables AND 361 of carry logic 360 to pass the carry output 357 of full adder 356 through OR gate 362 to carry output 308. That is, when lines 305–307 call for a 10-bit sum, index unit 300 operates as a conventional 10-bit adder with an indication of a carry out of the tenth position.

When, however, a "one" appears on line 306 (and "zeroes" on lines 305 and 307), AND gate 358 is enabled through inverter 359, while AND gate 354 is disabled. Since AND 358 is connected to one of the lines 301 instead of to the output 355 of full adder 356, the most significant bit of input 301 is passed to the most significant output bit 304 directly rather than being added to the most significant bit of input 302. Line 306 also conditions AND gate 363 to transmit the carry signal on line 347 from adder 346 through OR 362 to carry output 308.

With a "100" pattern on lines 305–307, AND gate 358 remains enabled, but OR 343 receives a signal from AND 348, rather than AND 344. Line 305 also conditions AND 364 to produce the carry signal on line 308 from the carry output 337 of full adder 336. Under this condition, then, the low-order eight bits of line 301 are added to the low-order eight bits of lines 302, while the two high-order bits of line 301 are transmitted directly to the two-high order bits of line 304.

It may now be seen that index unit 300 operates as a variable modulus adder which also has a variable base. That is, it is a modulo-1024 adder when line 307 is active; when line 306 is active, the modulus is 512, and the possible range of sums is either 0–511 or 512–1023, depending upon the high order bit of line 301. A carry signal is produced on line 308 when the sum generated by stages 310–340 exceeds 511, regardless of the value of the high-order bit of line 301. When line 305 is active, the addition modulus is 256, and the range of possible output numbers is 0–255, 256–511, 512–767 or 768–1023, depending upon the values of the two high-order bits of lines 301. Again, line 308 has a carry signal when the sum generated by stages 310–330 exceeds 255, regardless of the values of the two high-order bits of line 301.

It will now be understood how index unit 300 provides a variable-modulus, variable-base wrap-around indexing function for data operand addresses. More or fewer stages may of course be provided in obvious ways, and other methods of implementing the above function will appear to those skilled in the art. The signal sources for lines 305–307, and the disposition of the carry signal on line 308, will be discussed in connection with FIG. 6.

Logic Unit

Figure 4:
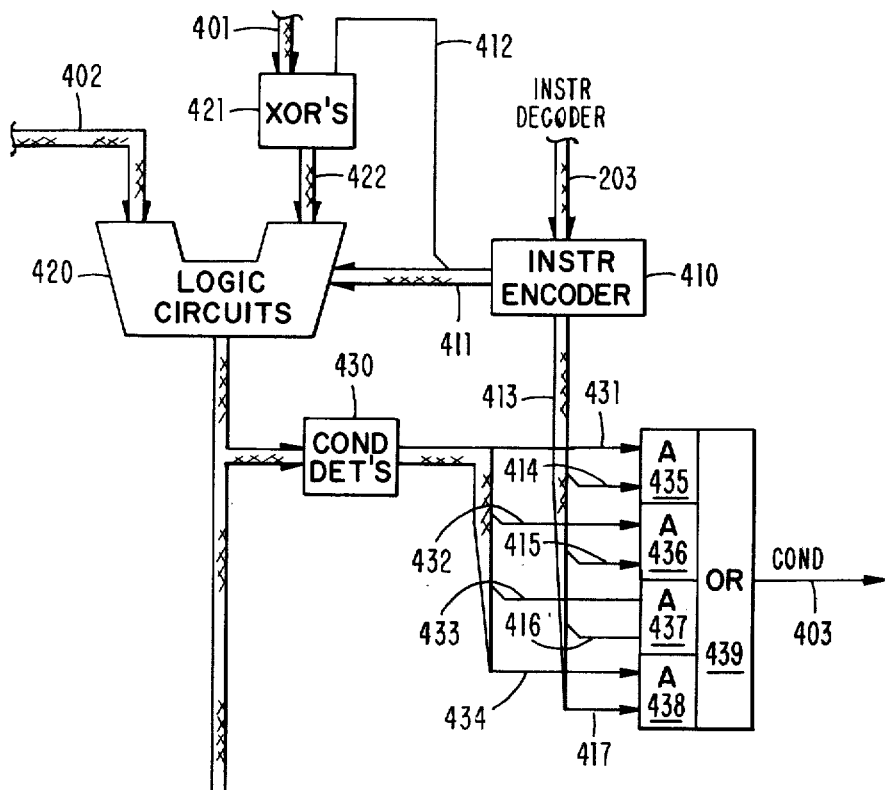
FIG. 4 illustrates the logic unit 400 of FIG. 2.

Logic unit 400, FIG. 4, accepts signals on lines 401 from gate 241 (FIG. 2) and on lines 402 from gate 242, and provides output signals on lines 404 in accordance with one of a number of operations specified on lines 203 from instruction decoder 230. The signals on lines 203 and 404 also cooperate to produce a condition signal on line 403.

As in common practice, instruction encoder 410 provides signals on line 411 indicating which logic operation is to be performed for an instruction decoded by instruction decoder 230. These signals control conventional logic circuits 420. A signal on line 412 additionally conditions exclusive-or (XOR) gates 421 in order to transmit either true or complement signals from line 401 to line 422. Logic circuits 420 comprise eight controllable circuits, one for each of the bits on lines 402 and 422, and are capable of performing the following operations: An "OR", "AND" and "Exclusive-OR" upon corresponding bits of each of the lines 402 and 422, and direct transfer of the bits from lines 422 to lines 404. Other conventional logic and/or arithmetic functions may of course also be provided. Condition detectors 430 are coupled to output line 404 for detecting various bit combinations resulting from the logic operations performed by circuits 420. Detector output lines 431–434 may, for instance, provide signals respectively indicating that all the output bits are all "zero", all "one", not all "one" and not all "zero". These lines are coupled to the inputs of AND's 435–438 which also receive signals from instruction encoder 410 via lines 414–417. Inputs 414–417 select one of the conditions which may have been detected by detector 430 for transmission through OR gate 438 to condition-output line 403.

An instruction signal on line 203, for instance, which indicates that logic circuits 420 are to perform an "AND" operation will produce a signal on line 414, so that an all-zero result on line 404 will produce a condition signal on line 403. Similarly, an "OR" type of instruction will produce a signal on line 415, so that line 403 will produce a signal when the output bits are all one. As is indicated in FIG. 4, other types of instructions may call for other bit configurations to produce an output on line 403. It is also possible, of course, that two different instructions from decodeer 203 which produce identical signals on lines 411 may produce different signals on line 413. An "And Mask Not Zero" instruction, for example, performs a logic AND of two operands, but activate line 417 instead of line 414, so that output 403 produces a condition signal when the result is not all "zero". Although it has not been found necessary here, it would also be possible to provide a specific instruction for selecting among the various conditions to be tested.

The signal on line 403 controls the modification of the instruction-execution sequence, in conjunction with certain bits of status registers 600, which will be described in connection with FIG. 6.

Result Registers

The purpose of result register unit 500 FIG. 5, is to perform voting or counting operations upon successive input operands, and to gate the results to one of several output lines. Unit 500 also performs "shift-load" operations.

Each result register unit 510, 520 and 530 contains a bank of eight AND gates 511, 521 and 531, and an eight-stage trigger register 512, 522 and 532. Each trigger register is of the conventional type in which each stage may be individually set to a logic "one" level, but the stages are reset to a "zero" level in parallel by a single "clear" input 513, 523 and 533. Such registers also commonly employ a "clock" line (not shown) for synchronization purposes.

As will be explained hereinafter, certain instructions in the instruction set of processor 200 cause instruction decoder 230 (FIG. 2) to produce a "push" signal on one of its output lines 203. This signal conditions inputs 534 of AND gates 531 to set those stages of register 532 for which a logic "one" signal appears on both the inputs 535, which are connected to the eight bit positions of the logic-unit output lines 404, and the outputs 526 of RR2 520. Outputs from the individual stages of register 532 are collected at outputs 536, and are routed to other parts of processor 200 on lines 537 as shown in FIG. 2.

AND gates 521 of result register 2 (RR2) 520 are conditioned by push inputs 524 and by outputs 516 of RR1 510, acting through shift gates 540. Gates 521 are then fully enabled by inputs 525, which also are connected to the eight bits of lines 404 to enter logic "ones" into particular stages of trigger register 522. The output 526 of each stage of register 522 is transmitted within the processor 200 as is shown in FIG. 2. Outputs 526 and push inputs 534 then proceed to AND's 531 of result register 3 (RR3) 530 as described.

Inputs 515 are also coupled to the respective bit positions of lines 404 and to push line 203 to enter data from LU 400 into trigger register 512. (Inputs 518 may be considered to be active for the moment.) RR1 output lines 516 are coupled to line 517 and routed as shown in FIG. 2. Outputs 516 also proceed through shift gates 540 to RR2 520.

Additional stages may be coupled to RR3 530 in the same manner in which it is connected to RR2 520, if desired.

The operation of result-register unit 500 for voting logic is as follows. Considering for the moment only a single bit position of each register, and disregarding shift gates 540, assume that all registers 512, 522, and 532 have been initially cleared to "zero" by signals on lines 513, 523 and 533. A push signal on lines 514, 524 and 534 will not change the contents of any trigger registers if the corresponding data bit on inputs 515, 525 and 535 is a "zero". If the latter inputs carry a "one", however, it will be entered only in register 512, and not in registers 522 and 532. A "zero" at inputs 515, 525 and 535 on a succeeding machine cycle will have no effect on the register contents, since register 512 can only be reset by input 513, and ANDS 521 and 531 are not fully enabled. A similar result obtains when push inputs 514, 524 and 534 are zero, whatever the state of the data inputs. When both the push inputs and the data inputs are logic "one", however, AND 521 is fully enabled by inputs 524, 525 and 516 (via output 546) to enter a "one" into register 522. Because of a delay inherent in the operation of the trigger registers, output 526 is not yet capable of providing an input to AND 531. Thus, at the end of two instruction cycles, registers 512 and 522 both contain a "one", while register 532 contains a "zero". On a third instruction cycle, the presence of either a zero on push inputs 534, or a one on 534 and a zero on data input 535, will leave the contents of all registers unchanged. A logic "one" on the inputs 534 and 535, however, will allow the "one" on line 526 to be entered through AND 531 into register 532. Any additional stages coupled to register 530 would operate in a similar manner. That is, when the "push" line is active, the "one" bits of successive data operands are propogated to successive stages of register unit 500.

Gate 254 (FIG. 2) may then select one of the lines 517, 527 and 537 under the control of a signal from instruction decoder 230. A logic "one of n" function of two or more successive operands, for instance, may be entered into DIR 253 merely by selecting lines 516 to be transmitted through gate 254. The logic functions "two of n" and "three of n" may be selected by respectively gating either lines 526 or 536 into DIR 253 after the passage of n successive operands.

Output lines 516 and 526 may also be gated to other points within the processor 200.

Shift gates 540 and input lines 518 cooperate to perform another function, known as "shift-load". The significance and use of this operation will be described in connection with the instruction set. During the execution of voting-logic instructions, shift gates 540 pass the signals on lines 516 directly to corresponding output lines 546 without any modifications.

When a shift signal from decoder 203 is present on input 544, gates 540 selectively shift the signals on lines 516 by one, two or four places to the left or right, depending upon the state of the shift signal. Circuits for performing this function are well known. The shift is of the "end-around" type, wherein any bits shifted off the left end of gates 540 are reentered on the right end, and vice versa. The bits on line 527 are then passed through LU 400 and selectively re-entered into register 512, after registers 512 and 532 have been cleared. The selection is accomplished by energizing only certain ones of the inputs 518, in accordance with particular bits in the current instruction. The instruction then places selected bits from another operand on line 404 into other positions of register 512, again under the control of inputs 518. If RR1 originally contains an operand J having bits (J0 J1 J2 J3 J4 J5 J6 J7), and an instruction calls for the shift-left load-right of an operand K having bits (K0 K1 K2 K3 K4 K5 K6 K7) by two places, the final result-register contents would be:

| RR1: | J0 | J1 | J2 | J3 | J4 | J5 | K6 | K7 |
|------|----|----|----|----|----|----|----|----|
| RR2: | J2 | J3 | J4 | J5 | J6 | J7 | J0 | J1 |
| RR3: | 0  | 0  | 0  | 0  | 0  | 0  | 0  | 0  |

Status Registers

Status registers 600 are groups of single-bit latches whose function may be broadly stated as that of retaining specific items of information over the execution of a number of instructions within processor 200. They may also be conceptualized as extensions to OPR 229, to provide additional bits in the operation codes of certain instructions which alter the operations performed by those instructions. Such alteration greatly multiplies the apparent size of the instruction set, yet does not significantly increase the amount of storage required for operation codes. As a general statement, the status registers 600 may be said to embody the heart of the present invention.

Registers 600 receive inputs 232 from instruction decoder 230 and inputs 204 from other units within processor 200. The particular instructions which produce signals on lines 232 will be discussed in greater detail in connection with FIG. 7. Output lines 205 control gating and other functions within processor 200.

The "discard result register" register 610 indicates whether the contents of RR1 510 have been stored elsewhere, and may thus be overwritten by subsequent instructions. A group of instructions, referred to as "store RR" instructions, sets latch D, which disables AND gate 611 via inverter 612, since any instruction which stores RR1 510 makes its contents available for later instructions. As has been explained, however, any "logic" instruction executed by LU 400 produces an output on lines 404 which modifies the contents of RR1 510; therefore, these instructions reset latch D through OR 613, which enables AND 611 through inverter 612 so that a subsequent "load" instruction will transmit a signal on an output line 205 which causes gates 254 and 271 to transfer the contents of RR1 510 through DIR 253 to SSM 270. A "load"-group instruction by itself is prevented from activating AND 610 by delay 614, although a second "load" instruction will cause a transfer. That is, "store RR", "logic" and "load" instructions affect the state of latch D, but only "load" instructions use the state of latch D to transfer RR1 510 to SSM 270.

The "high-bit" register 620 specifies the value of the most significant bit of DAR 262, via gate 263. The occurrence of a "set addressing status" (SAS) instruction from decoder 230 enables AND gates 621 and 622 to receive a control bit from the SAS instruction located in SR 243. A "one" bit will set latch H through AND 621, while a zero bit will reset latch H through inverter 623 and AND 622. An output line 205 then transfers the value of this bit through gate 263 to DAR 262, as shown in FIG. 2. Thus, register 620 specifies whether subsequent instructions will address the top half or the bottom half of DSM 260.

"Data-control" register 630 maintains a record of the amount of video data present in DSM 260, in order to avoid writing into the data queue when it is full or reading from it when it is empty. Register 630 also allows data to be read automatically from video processor 150 in parallel with the execution of other instructions within processor 200. Whenever processing circuits 150 are ready to transmit a video byte from register 281 into DSM 260, a signal on line 151 sets latch V to condition AND 631. Two other conditions, however, are required before this request may be honored. The first condition is that the instruction currently being executed by execution unit 250 does not require an operand to be read out of or written into DSM 260. Such instructions are grouped together as "video service" instructions in decoder 230 and provide an output signal on a line 232 to provide another input to AND 631.

The other condition is that DSM 260 have an available memory location for the video data. This condition is transmitted from overflow latch Q to AND 631 through inverter 632. The output of AND 631 is transmitted to gates 253 and 254 to allow VR 281 to be transferred to DIR 253 and thence to DSM 260. The output of AND 631 is also fed back to AND 633. This gate then sets latch Q if comparator 634 detects that the contents of TOP 264 is equal to the contents of BOT 267. That is, an equality in the contents of registers 264 and 267 occurring immediately after the loading of a video byte indicates that DSM 264 has wrapped around to the point at which the video string begins, and can therefore not accept any further data. As will be explained in greater detail hereinafter, the "load video" (LV) instruction has the effect of destructively reading a video byte from DSM 260. This occurs when AND gate 635 passes a signal to gate 26A to read a byte from DSM 260 into DOR 269. Underflow latch U, however prevents this transfer via inverter 636 when no video data is present in DSM 260. Underflow latch U is set through AND 637 and OR 638 by the output of AND 635 whenever comparator 634 indicates equality between the contents of registers TOP and BOT. This condition signifies that a previous transfer has collapsed the data string to the point where the beginning and ending addresses are the same. Latch U is reset by any of the video-service instructions when latch V is set, since these instructions allow a video byte from VR 281 to be loaded into DSM 260, and V indicates that a byte is ready for loading. The output of AND 635 also resets overflow latch Q through OR 639, since a transfer out of DSM 260 creates at least one free location for the writing of a new video byte. Latches U and Q may be initialized to indicate an empty data string by a special instruction ZTB acting through OR's 638 and 639.

Register 640 controls the execution of conditional branching in instruction unit 250. Its operation is initiated by a "condition branch" (where "condition" is a verb, not a noun) instruction having the mnemonic CB. The detection of a CB operation code in register 229, FIG. 2, causes instruction decoder 230 to store bits 4–15 of the CB instruction in BAR 225, and to emit a signal on one of the lines 232 to set limit latch L, FIG. 6. This line also sets mask latch M through OR gate 64. Thereafter, a subsequent instruction which produces a signal on condition line 403 (from condition detector 430, FIG. 4) causes AND 642 to set branch latch B, the output of which effects the branch operation by controlling gate 222, FIG. 2, to transfer the contents of BAR 225 to PAR 223. Latch B is then reset for subsequent instructions by a signal on a line 202 from timing circuits 201. The output of latch B also resets latches L and M through ORs 643 and 644, in order to prevent instructions subsequent to the branch execution from again transferring to the same branch address.

Latches L and M may be reset through ORs 643 and 644 even when the branch has not been executed. This action is desired when the instruction stream contains any one of a number of instructions which may be termed "de-condition branch" instructions. Such instructions produce a signal on one of the lines 232 from instruction decoder 230. The action of these instructions is to destroy any further access to the address placed in BAR 225 by any preceding CB instruction. Certain other instructions, known as "load" instructions, prohibit the execution of a branch during the execution of one or more instructions, but still allow a branch address specified by a previous CB instruction to be executed when certain further conditions have been met. The "load" instructions reset latch M through OR 644. The simultaneous presence of three further conditions then allows subsequent instructions to execute a branch to the address specified by the previous CB instruction, by setting latch M through AND 645 and OR 641. One of the conditions required by AND 645 is a "set" state of latch L: that is, register 640 must not have been completely deconditioned through OR 643. Another condition is the occurrence of an all-zero address in SAR 272, which is sensed by zero detector 646. As will be explained, that is necessary in order to prevent a branch address which had been set up at one level of a logic function from being taken at a different level of the function. The third condition required by AND 645 is the existence of an instruction in the group named "stack logic" instructions. Those instructions in the instruction set of processor 200 which belong to the "de-condition", "load" and "stack logic" groups are identified in Table I, below.

"Carry" register 650 is responsive to an SXS (set indexing status) instruction to provide signals on lines 305–307 for controlling index unit 300, FIG. 3. The detection of an SXS instruction by instruction decoder 230 produces a signal on one of the lines 232 which enables AND gates 651–654 to accept two of the four SXS control bits on lines 204 from SR 243, FIG. 2. These two bits will then set or reset latches C0 and C1 through AND's 651–654 and inverters 655 and 656. The four possible bit combinations in these latches are then decoded by decoder 657 to produce a signal on only one of the lines 305–307.

"White-fill" register 660 controls the effect of a wraparound which occurs in Index Unit 300. Register 650 receives control bits from an SXS instruction and carry signals from line 308 of IU 300. It produces a signal on a line 204 for controlling gate 26A of DOR 269, FIG. 2. Again, the detection of an SXS instruction by instruction decoder 230 produces a signal on a line 232 which conditions AND's 661–664 to receive two SXS control bits from SR 243. These bits set or reset latches W0 and W1 via AND's 661–664 and inverters 665 and 666.

When neither latch is set, OR 667 is prevented from producing an output under any condition, since neither AND 668 nor AND 669 is enabled. Under this condition, the data stored in DSM appears to repeat itself cyclically at the modulus specified by lines 305–307. The data may be stored in one of seveal different areas in DSM 260, however, because of the pass-through action of IU 300 and the high-bit logic 610. When line 307 is active, for instance, a 1024-byte data queue may be located either at DSM addresses 0–1023 or at 1024–2047, depending upon the state of latch H of register 610. A 512-byte data queue wraps around between DSM addresses 0–511, 512–1023, 1024–1535 or 1536–2047; its loction depends upon both latch H and the high-order bit of the absolute operand address, since the latter bit passes through IU 300 unchanged when line 306 is active. Similarly, a 256-byte area may be placed in any one of eight blocks of DSM 260.

When latch W1 is set, however, AND 668 and OR 667 operate to disable gate 26A whenever a carry signal on line 308 indicates that an instruction has caused IU 300 to exceed the modulus selected by lines 305–307. When latch W0 is set, the absence of a carry from IU 300 opens gate 26A. Then gate 26A has been thus opened, the operand appearing in DOR 269 contains all zeros, instead of the contents of the DSM location passed from SR 243 through gate 263 to DAR 262. The net effect of this action causes DSM 260 to appear to an indexed instruction as having an area whose size is controlled by lines 305–307, and whose location is specified by latch H and possibly by one or two bits of the operand address contained in the instruction; outside that area, all data operands appear to contain zeros. The fourth possible combination, wherein both of the latches W0 and W1 are set, is not used in the present embodiment.

Control Gating

As has been stated, instruction decoder 230 and status registers 600 provide control signals to the units of FIG. 2 to interconnect them along specific data paths during the execution of each instruction from PSM 220. FIG. 6 shows the detailed implementation of logic circuits for status registers 600. The construction of a detailed implementation of the remaining control logic is straightforward, and will be obvious from the following operational description of a complete instruction set for processor 200.

To this end, FIG. 7 contains an APL description of the gating logic required for each instruction in the set. The APL notation is explained in, for example, "APL/360 Primer", IBM Systems Reference Library Form No. H20-0689-0 (Sept. 1969). In the description, the origin will be taken to be 0; then, the function 8, e.g., would expand to "0 1 2 3 4 5 6 7".

FIG. 7 first lists several common gating functions which are shared among many instructions. The first requirement for any instruction, for instance, is to fetch it from PSM 220. The function FETCH, therefore, first moves to POR 228 the contents of a location in PSM 220 specified by the value (to the base "two") stored in PAR 223; then, OPR 229 receives bits 0–7 of POR 228. Note that the names of the data sources and destinations in FIG. 7 correspond to the abbreviations used in the drawings and in the preceding description.

The remainder of FIG. 7, namely FIGS. 7a through 7i, lists each instruction in the set in the alphabetical order of its mnemonic. The "And" instruction A, for example, is first obtained with the FETCH function, explained above. Since the operand for this instruction is not indexed, the NOINDEX function causes gates 241 and 242 to place bits 6–15 of POR 228 into SR 243, and catenates the H bit and the contents of SR 243 into DAR 262. DFETCH then gates the contents of the DSM location specified by DAR 262 into DOR 269. Next, RR1 510 is gated to RR2 520 and the AND function of the RR2 and DOR bits is returned to RR1 510. Branching is enabled as a part of the execution of this instruction by setting the B latch if latch M is set and if the result of the AND is all zeros. RESET then zeros the contents of RR2 and RR3, and latch D is reset to zero. Finally, NEXT obtains the address of the next instruction from BAR 225 if B had been set; otherwise, the next sequential instruction is selected from DSM 220.

Four instruction formats are employed. Those instructions which specify a branch address have an operation code in bits 0–3 and an address value in bits 4–15. These instructions are B, CB and BAL. Instructions which specify an operand to be obtained from DSM 220 have an operation code in bit positions 0–5 and an address value in positions 6–15. Examples are the A, L, LR4, OX and XORS instructions.

Immediate-operand instructions, such as AMZ, CME and ZR, have an operation code in bits 0–7 and a byte of immediate data in bits 8–15. Control and miscellaneous instructions, such as READ, WRT and SXS also have an operation code in bits 0–7; bits 8–15 of these instructions contain up to eight control bits for various purposes.

Figure 6:
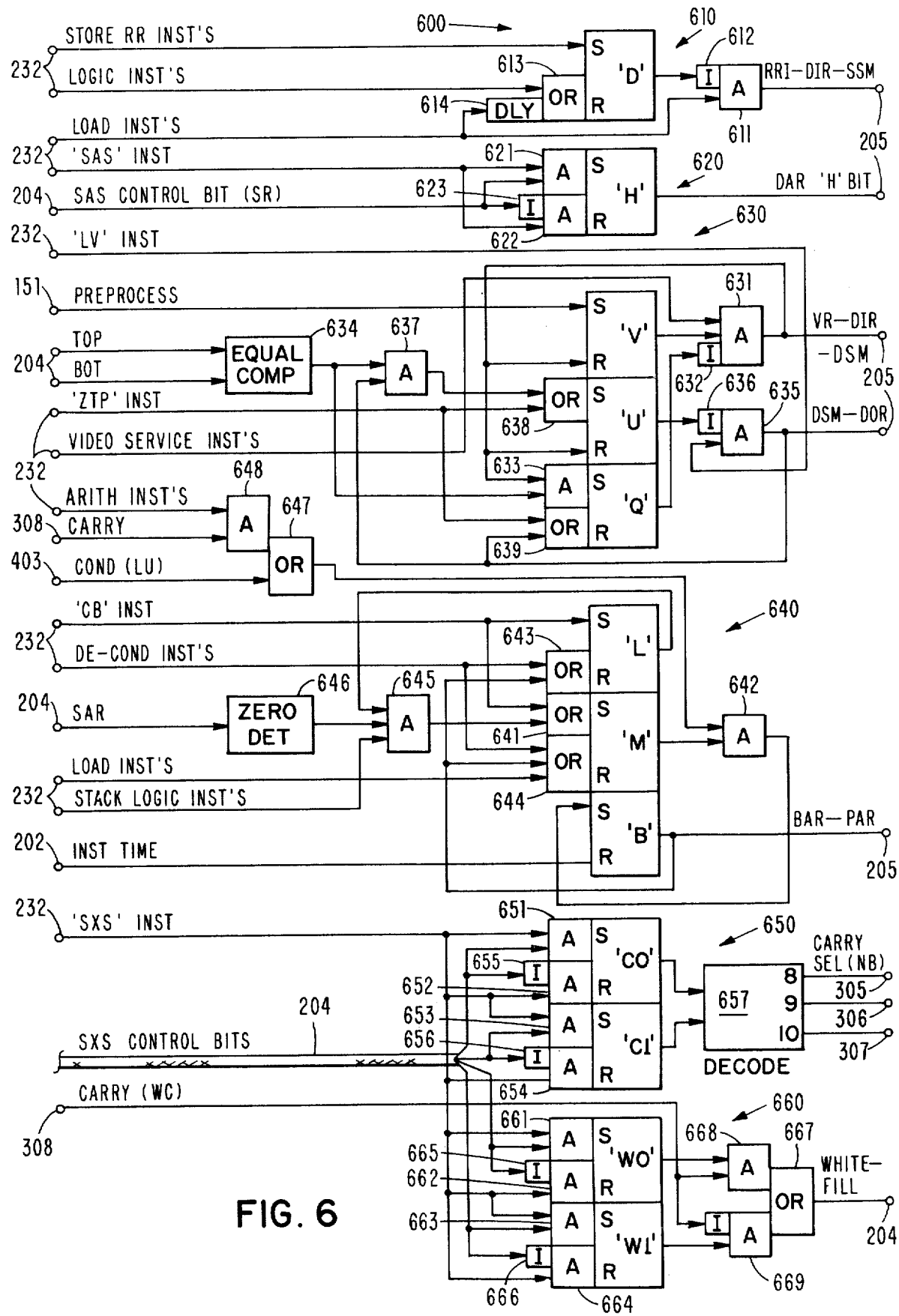
FIG. 6 depicts the status registers 600 of FIG. 2.

FIG. 7 shows which of the instructions produce signals on the various lines labelled 232 in FIG. 6. The "Store RR" instructions which set latch D, for instance, are precisely those which contain "D←1" in their description. Likewise, the "Logic" and "Load" instructions contain "D←0". "Load" instructions also contain "M←0", since they reset latch M, but do not affect latch L. "Video Service" instructions may be identified by the VIDEO common function. The "De-condition" instructions all reset latches L and M that is, "L←M←0". "Stack Logic" instructions are those which set latch M if latch L is set and if the address in SAR 272 is zero. These instructions, therefore, contain the descriptive notation "M←M v L ∧ 0 = v/SAR".

OPERATION

The operation of processor 200 will now be described in detail for the execution of those instructions which are critical to the present invention.

Branch Conditioning and Execution

The "Condition Branch" (CB) instruction is different in several respects from the "Branch on Condition" (BOC) or "Conditional Skip" instructions of conventional data processors. BOC instructions contain branch addresses which become effective during the execution of the branch instruction itself, based upon the existence of some previously determined condition. The specification of the particular condition to be tested is contained in the BOC instruction. A branch is either taken at a specific time in the program or it is never taken.

The present CB instruction, on the other hand, cannot of itself alter the sequence of program instructions. Rather, it operates to convert certain subsequent instructions into BOC instructions, and establishes an address to which they may branch; that is, CB merely conditions subsequent instructions to operate as branch instructions if certain conditions are fulfilled during their execution. The conditions which actually effect a branch are contained in the subsequent instructions, and not in the CB instruction. The AMNZ and AMZ instructions described in FIG. 7, for instance, produce identical results when a branch has not been conditioned, or when it has been masked or de-conditioned as explained in connection with FIG. 6. But, when a branch has been conditioned and not masked or de-conditioned, AMZ transfers control to the branch address when logic 420 produces all zeros, and AMNZ transfers control when RR2 520 does not contain all zeros.

The branch which is enabled or conditioned by the CB instruction cannot be executed by all subsequent instructions. Some instructions, such as SAS, canot cause a branch under any condition resulting from its execution. Instructions such as LK and SLS implicitly operate as "de-condition branch" instructions, in that they completely remove the conditioning established by a previous CB. "Load" instructions are those which implicitly remove the CB conditioning during their own execution and for subsequent instructions, until a "stack logic" reconditions the branch. The re-conditioning provided by stack-logic instructions (AS or OSC, e.g.) is itself conditional, since it takes place only when SAR 272 contains all zeros.

Referring to FIGS. 2, 6 and 7, the CB instruction itself activates the following gates. Initially, FETCH allows decoder 230 to decode the operation code, as has been explained above. Next, latches L and M are both set. Bits 4–15 of the instruction are then transferred to BAR 225, through gate 226. VIDEO services a video request if present, since DSM 260 is not otherwise used during the CB instruction. SAR 272 is then set to "0000". Finally, NEXT sets up the next sequential DSM address for the next instruction, since latch B was not set by the CB instruction. At this point the branch address specified in bits 4–15 of the CB instruction has been entered and retained in BAR 225, but no branch has been taken under any conditions which may have been produced by previous instructions.

Table I shows a program segment which illustrates the effect of a CB instruction, which appears as statement No. 2. Statement No. 3 performs a logical AND of the symbolic operands MAF2 and PC. From the control-gating description in FIG. 7, the instruction at statement No. 3 sets latch B if the logic AND of these two operands is all zeros, since latch M had been set by the CB instruction. If statement No. 3 does set latch B, the branch address "No. 57" is transferred from BAR 225 to PAR 223, and the next instruction executed is the BAL at statement No. 57. If latch B was not set, then statement No. 4 is executed next. Then, if that instruction produces an all-zero result, statement No. 4 will set latch B, and control will be tranferred to statement No. 57. Similarly, an all-zero result in any of the statements No. 5 through No. 14 will effect a branch to statement No. 57, without requiring any further branch instructions.

The above statements all performed a logic AND function, and effected a branch whenever the result contained all zeros. Other types of instructions, however, cause the branch to be taken under other conditions. Other instructions have yet other conditions: ADD, for instance, tests bit 15 of POR 228 and bit 1 of SR 243; TOX tests the high-order bit of DOR 269 and branches if it is a "one". These examples point out the facts that the conditions themselves may involve a separate computation, that the conditions to be tested may be obtained from different sources for different instructions, and that data or latch settings may be employed in addition to a direct computational result.

Proceeding through Table I, no branch can be taken at statement No. 15, since FIG. 7 shows that an LC instruction resets latch M. Instructions which reset latch M without resetting latch L are termed "load" instructions, since they perform the function of loading an operand into a register. In terms of their effect upon branching, they may also be called "mask" instructions, because they mask the conditioning effect of the previous CB instruction; they may perform functions other than loading a register. The mask emplaced by statement No. 15 is not automatically removed by the next instruction. Statement No. 16, for instance, cannot cause a branch for any result, since latch M is in a reset state during its execution. Statement No. 17, however, is a "stack logic" instruction and will therefore set latch M, since latch L is still set and SAR 272 contains all zeros. Statement No. 17 will then effect a branch (i.e., set latch B) if it produces an all-zero result in RR1 510. Masking and unmasking of a CB instruction may occur any number of times.

The primary purpose of masking is to ensure that a branch cannot be taken at a different parenthetical level of a logic equation than that which existed when the CB instruction occurred. In the present embodiment, such conditional branching is restricted to the first level — i.e., when SAR 272 contains all zeros. If found to be desirable, it would obviously be possible to provide additional gating facilities for recording the stack level at which a CB instruction occurs, and then to allow that address to be taken only at the same stack level.

Another group of instructions, named "de-condition" instructions in FIG. 6, cause the effect of a previous CB instruction to be terminated absolutely. These instructions reset latches L and M. Although the previously specified branch address remains in BAR 225, it can never be transferred to PAR 223, since latch B can only be set when latch M is set, latch M can be set only when latch L is set, and only a subsequent CB instruction can set latch L. Such a subsequent CB instruction will, of course, contain its own branch address, which will overwrite any address previously placed in BAR 225. De-condition instructions are generally those which themselves cause branching or linking, or which load specified registers.

OPERAND INDEXING

As has been described in connection with FIGS. 2 and 6, the operand addresses contained in some instructions are indexed before being applied to DAR 262 of DSM 260. Indexing is well known in conventional computer structures; in these conventional structures, however, address warparound occurs at the end of the physical memory, and is usually unintentional. In the present system, an instruction within the program flow sets an artifical memory size as a modulus for aaddress warparound. Therefore, one or more selectable portions of DSM 260 appepar to a program to be cyclically repeated.

Instructions having indexed operands, such as ACX, LX, OCX, etc., employ the INDEX gating function shown in Table I. This function expresses symbolically the operation of Index Unit 300 (as explained in connection with FIG. 3), followed by the transfer of SR 243 to DAR 262 via gate 263. The symbol "NB" in FIG. 7 is a collective name for the outputs 305–307 of decoder 657, FIG. 6. As has been explained, the value of NB is set by two control bits in an SXS instruction, whch set latches C0 and C1 (collectively named "C" in FIG. 7. In the present embodiment, the possible values for NB are "8", "9" and "10", which correspond to memory segments of 256, 512 and 1024 bytes, respectively. Other values could be chosen, and it would of course be possible to choose memory-segment lengths which are not integral powers of two, if desired. As explained in connection with register 650, FIG. 6, modular indexing may be used to confine the actual data operands fetched by indexed instructions to a particular area of memory. In the recognition of OCR A-Font charactes, for example, the recognition logic need test only eighteen scans at any time. Therefore, operand addresses may be indexed from an arbitrary point within a 256-byte data area to any other point in the same area, without creating any programming overhead, for ensuring that the absolute address produced by the indexing operation remains within the area.

The common function WHITEFILL, FIG. 7, describes the generation of the signal at the output of OR gate 667, FIG. 6, from the carry signal WC on line 308. As has been explained, the signal from OR 667 controls gate 26A into DOR 269. Turning now to the description in FIG. 7 of a typical indexed instruction, it will be seen that in the AX instruction, for instance, the primary logic function performed is an AND between RR1 510 and DOR 269. The latter quantity, however, is ANDed with WHITEFILL, so that the operand from DOR 269 is effectively made all zeros when there is no output from OR 667, regardless of the actual content of the DSM location addressed by DAR 262.

The combination of variable-modulus indexing and white filling allows processor 200 to focus on a particular portion of an input video pattern, while blanking out the remainder of the pattern. That is, this feature creates a background-color mask having a variable-size window which may be placed over the pattern.

Voting Logic

The set of result registers 500, FIG. 5, provide a simple and rapid calculation of voting-logic ("m out of n", or "m/n") functions. Although circuit modules for performing these functions are known in the art, they have not found their way into the architecture of general-purpose computers. The present invention, however, allows their inclusion at minimal additional cost.

Voting logic is performed by the programmer with the "Push" (P, PC, PCX, PX, PSC, PX) instructions, as described in FIG. 7. An instruction such a "L Z55", for instance, fetches the operand Z55 from DSM 260 and loads it in RR1 510. An instruction "P Z68" then places the "½" function of Z55 and Z68 in RR1 510, and also places the "2/2" function of the same operands in RR2 520. A further instruction "P Z74" deposits the "⅓", "2/3" and "3/3" functions of all three operands in RR1 510, RR2 520 and RR3 530, respectively. Additional instructions of the same type would place the "1/n", "2/n" and "3/n" functions of the n operands in the result registers. If desired, additional hardware result registers could be provided to allow the calculation of the "4/n", "5/n", etc. voting functions. Three result registers allows the calculation of any voting function in which either m or n—m+1 is three or less, since the m/n function of variables X1, X2, ... Xm is identical to the complement of the (n—m+1)/n function of the variables X1, X2, . . . Xm. The "push complement" instructions perform the operand inversions with no time penalty.

After a sequence of push instructions, the voting-function results are available in the registers 510, 520 and 530 for direct use by other instructions. Normally, however, one or more of the results will be stored in DSM 260 or SSM 270 by a "Store" instruction such as S, S2, S3, SS, S2S or S3S.

The usefulness of this implementation becomes even more apparent when it is considered that the "1/n" and the "n/n" voting functions are identical to the Boolean OR and AND functions, respectively. Thus, for instance, the OR and AND of three variables may be calculated and stored with only five instructions (one load, two push and two store), whereas a conventional one-address processor would require at least eight instructions.

Data Input

Unbuffered video bytes from processing circuits 150 are transmitted to video register 281, and thence through gate 254 and DIR 253 into DSM 260. To feed such asynchronous data by cycle-steal or interrupt methods would tie up the entire processor memory for a data-entry operation and might also require additional programming steps. The use of dual parallel processors for this operation would require a significant amount of additional hardware and complex interconnection and priority logic. Instead of these more conventional techniques, processor 200 uses a quasi parallel-processor approach in which one of the processors is implemented as special-purpose hard-wired logic 630. This logic is responsive to a signal generated in instruction decoder 230 to perform in one instruction cycle a number of operations (each of which would require a full cycle in a fully programmed processor) for controlling gates 254, 261 and 263.

The hardware used in implementing this feature has been described hereinabove. The equivalent APL description is contained in the VIDEO function shown in FIG. 7. Those instructions in FIG. 7 which do not have the VIDEO function require operands from DSM 260; hence, no data input thereto is possible The instructions which obtain their operands from other sources, however, generate a "video service" signal to logic 630, which initiates the VIDEO function. Referring to FIG. 7, the AMZ instruction, for instance, causes a previously conditioned branch address to be effective upon the occurrence of a specified result of a logic operation. The operands for this instruction are obtained from RR2 520 and from POR 228. During the execution time of this instruction, logic 630 determines whether VR 281 contains a new byte of video data, and whether DSM 260 contains a free location to store it. If both conditions exist, then the contents of VR 281 are gated into DSM 260, and the contents of TOP 264 are simultaneously transmitted to DAR 262. If either of the conditions is not fulfilled, then no data is entered into DSM 260.

Automatic Result Stacking

The storage of intermediate results in a stack has been employed in conventional practice. The present invention, however, contains a simplified control mechanism which combines a conventional data memory with a hardware stack, and which stores data in the stack only when required to preserve the data. Moreover, selection between the stack and the random-access memory need not entail additional programmed instructions. This feature is especially useful for the evaluation of multilevel logic equations.

When an explicit "store" instruction is employed in a program, the contents of RR1 510 are placed at a DSM address specified by the instruction. Therefore, RR1 510 may be overwritten by a subsequent instruction without totally destroying the previous result, since it has been preserved in DSM 260. Hard-wired logic 610 performs this function by setting latch D (D←1 in FIG. 7) whenever the contents of RR1 510 are stored. When no such storage has occurred, any "logic" instruction resets latch D (D←0 in FIG. 7) so that a subsequent "load" instruction causes AND 611 to transfer the contents of RR1 510 through gates 254 and 271 to SSM 270. This operation is shown as the STACKIN function in FIG. 7. Since this transfer occurs before new data enter RR1 510, the previous contents are automatically saved. The "load" instructions also reset latch D after a delay. Thus the first "load" instruction following a store instruction overwrites RRL 510, but subsequent "load" instructions cause a transfer to SSM 270.

Data may also be stored in the stack under explicit program control. Instructions such as SLS, SS, S2S, etc. place the contents of RR1 510 in SSM 270 regardless of the state of latch D. These instructions also set latch D, since RR1 510 may safely be overwritten by subsequent instructions. It may be seen, then, that this feature provides both automatic and explicit control of data entry into SSM 270, and that automatic operation is provided without any software overhead.

Shift-Load Functions

The inclusion of shift gates 540 in result-register unit 500 allows the performance of an unconventional function which considerably reduces processing time in certain applications. This function is executed by the "Shift Left Load Right" and "Shift Right Load Left" instructions LR(N) and LL(N) respectively, which also exist in the indexed-operand forms LRX(N) and LLX(N), and in the stack-operand forms LR(N)S and LL(N)S. The "N" in the mneomnic represents the number of bits to be shifted and loaded, and is encoded in two bit positions in the instruction word. In the present embodiment this number may be one, two or four.

The control-gating description for the above instructions is contained in FIG. 7. As a specific example of their operation, consider the instruction LR4. After the instruction is fetched, any previous CB instruction is deconditioned by resetting latches L and M. The number (four in this case) of bits to be shifted and loaded is then obtained from bits four and five of the instruction in POR 228. Bits six through fifteen of POR 228 tare transferred to SR 243 without indexing, and thence to DAR which also receives the state of latch H in its high-order position. DSM 260 then outputs into DOR 269 the contents of the location specified by DAR 262. RR2 520 and RR3 530 are reset to zero. The contents of RR1 510 are end-around shifted by four places and transferred to RR2 520, so that positions (0, 1, 2, 3, 4, 5, 6, 7) of RR2 520 contain positions (4, 5, 6, 7, 0, 1, 2, 3) of RR1 510. The contents of bit positions (4, 5, 6, 7) of DOR 269 are then loaded into positions (4, 5, 6, 7) of RR1 510. Finally, PAR 223 is incremented by one by NEXT, since conditional branching has been disabled.

At the completion of any shift-load instruction, RR3 530 contains all zeros. RR2 520 contains the end-around shifted version of the byte previously stored in RR1 510, the amount and direction of the shift being controlled by certain bits of the instruction. RR1 510 retains a portion of its original contents, and also contains a portion of another operand. The instruction specifies the source of the operand and whether or not it is to be indexed. It will be noted at this point that a sequence of shift-load instructions may be employed to place bits from more than two operands into a single data byte in RR1 510.

Programming Examples

Table I shows a typical instruction sequence for recognizing a machine-printed character on a document. Each instruction in this source listing has a statement label, an operation code and an operand description. The operands beginning with M through Z represent certain "features" or subpatterns of the character, and may be derived by hardwired logic circuits, or by the evaluation of logic equations in processor 200 or in another special-purpose or general-purpose data processor. Operands beginning with A through L represent video bits taken directly from the input pattern stored in DSM 260.

The program segment in Table II evaluates the Boolean expression T0 = (PC.MAF2.Z3.$\overline{Z64}$.$\overline{K9}$.$\overline{K10}$.$\overline{Z9}$.$\overline{Z80}$. $\overline{Z43}$.$\overline{Z11}$.$\overline{Z23}$.Y311).(($\overline{YL11}$).(Z68 + Z55).(Z45 + Z21).(Z58 + Z74. $\overline{Y83}$.Z13).(Z49.$\overline{Z13}$ + Z48)).((Z1 + Z58.Y21.Z21.Z42).($\overline{YB45}$ + $\overline{Z118}$.$\overline{Z108}$)).(($\overline{X246}$.$\overline{Z49}$ + $\overline{Z76}$).(Z72 + Z40).($\overline{Z69}$ + YR36)). ((YO10 + Z55).(YB65)), (YB65)), which represents an OCR-A font numeral "2" in terms of the named features and video bits. That is, if the equation is satisfied, the character being classified may be a "2". Other equations for other characters must also be evaluated, until one and only one of them is satisfied.

The complexity and number of these Eequations points out the well-recognized deficiencies in the application of conventional computers to pattern recognition. The brute-force evaluation of all terms of each equation requires inordinate amounts of time, while the inclusion of testing instructions after the appropriate terms requires excessive amounts of storage. The overhead involved in data management and other auxiliary functions consumes even more time and/or storage.

The CB instruction at label No. 2 is extremely important in overcoming these problems. This single instruction is effective to cause a branch to statement No. 57 from any of the twenty-three statements No. 3–No. 14, No. 17, No. 20, No. 25, No. 29, No. 35, No. 39, No. 43, No. 46, No. 49, No. 52, and No. 53. As may be seen from the logic equation, these statements are points at which the value of the entire function can be tested. That is, the equation is false if any of the designated instructions returns a "zero" result, since they all involve logic AND operations. The possibility of branching is masked at statements No. 15, No. 18, No. 21, No. 26, No. 30, No. 36, No. 40, No. 44, No. 47 and No. 50 since the corresponding load instructions reset latch M and push an intermediate result into SSM 270. A subsequent instruction such as No. 16 cannot then cause a branch, since the stack remains pushed down until it is popped by the AS instruction at No. 17. Otherwise, the OR operation at No. 16 would cause a branch for a "one" result, since the truth of any OR'ed operand at the highest level of an equation establishes the value of the equation without further processing. The branch address established by the CB instruction is absolutely deconditioned by statement No. 54, which stores the value of the logic function. Thereafter, no conditional branch can be taken until another CB instruction sets up another address in BAR 225. If the CB instruction at statement No. 2 results in a branch, the execution of the branch also provides a deconditioning operation until another CB instruction occurs.

The program segment in Table I also illustrates the use of automatic stacking of intermediate results. Although the logic-equation operands PC, Z3, Z64, etc. are obtained in the conventional manner from the random-access DSM 260, Table II has no explicit commands for storing any result except the final value of the function. Instead, the load instructions at statements No. 15, No. 18, No. 21, No. 26, No. 30, No. 36, No. 40, No. 44, No. 47 and No. 50 automatically store the previous computational results in SSM 270. Statement No. 1, for instance resets latch D if it had been set by a aprevious store instruction, and loads operand PC into RR1 510. Statement No. 2 does not use RR1 510, so requires no storage of its contents. Statements No. 3–No. 14 perform successive AND operations, leaving an intermediate result in RR1 510. The load instruction at No. 15 transfers this result of SSM 270 before writing its operand in RR1 510, since latch D is reset. Latch D remains reset until statement No. 54 stores the contents of RR1 510 into DSM 260. A subsequent load command would then merely overwrite the previous contents of RR1 510.

Any instruction which stores data in SSM 270 also increments SAR 272, as is done in conventional practice. Likewise, the retrieval of data from SSM 270 decrements SAR 272. Data bytes are retrieved from the stack by "stack-logic" instructions such as statement No. 17. In actuality, operation-code space is saved by making the stack-logic operation codes the same as those for the corresponding ordinary logic instructions; the mnemonics are different only for ease of reading a program. The "stack-logic" instructions are differentiated from their counterpart logic commands in that the former have absolute DSM addresses of "0000", which is detected by decoder 231, FIG. 2.

Another function which occurs implicity in the above program segment is the loading of video data from VR 281 into DSM 260. This operation may take place during the execution of statements No. 2, No. 17, No. 20, No. 25, No. 29, No. 35, No. 39, No. 43, No. 46, No. 49, No. 52 and No. 55–No. 57, since these instructions do not otherwise employ DSM 260. Thus, input data may be entered into processor 200 during about 25% of the instruction cycles shown. The data bytes are automatically fed into successive DSM locations by means of BOT 267, DAR 262 and incrementer 265. Registers TOP 264 and BOT 267 are initialized for each input character by an instruction of the form "ZTB K1, K2", where K1 and K2 are two four-bit immediate operands. As may be seen in FIG. 7, these operands set the four high-order bits of TOp 264 and BOT 267; the low order seven bits of these registers are reset to zero.

Statements No. 6 and No. 7 in Table I contain instructions having indexed operands. Suppose that a previous instruction "SXS 0, 0" had already set logic circuits 650 and 660 to select an eight-bit addition modulus and to disregard carries from IU 300. Also suppose that two other instructions "F BEGIN" and "LXR 16" had placed the sum of the symbolic variable "BEGIN" and the immediate data "16" into XR 244. Then the actual operand address used by statement No. 6 is the modulo-256 sum of the low-order eight bits of the address of K9, the value of the operand BEGIN and the constant "16", this sum then being added to 256 times the sum of the two high-order bits of the address of K9 and to 1024 times the value of the H bit.

Table II illustrates a program segment for creating shifted replicas of an input pattern.

The video spots and measurements employed in pattern recognition normally have only two states: white or black, on or off, etc. Although a single-bit operand is capable of expressing these states, the data paths of execution 250 are eight bits wide. This feature allows the simultaneous examination of corresponding video bits or measurements from eight different patterns. In many applications of the present system it is desirable to execute the same recognition algorithm on each input pattern in several different locations on the pattern, to correct for size and positioning errors. The "shift-load" instructions described hereinabove offer a convenient and rapid method of generating patterns which are replicas of the original input pattern except that they are displaced one or more bit positions horizontally and/or vertically.

Table II shows a program sequence for generating an "8 by 1" expansion of a video pattern. That is, if the pattern is scanned with vertical raster scans having, e.g., fourteen bits per scan, then the 8 × 1 expansion loads one horizontally adjacent bit from each of eight scans into a single byte in DSM 260. The operands in Table II are referenced to bits 1-8 of scan A, and the final results are located in the variables ZZ1-ZZ8. The ZZ1 byte originally contains the most recent eight bits from VR281, and is loaded into RR1 510 by an instruction preceding those shown in the table. It should be noted that the "store" and "load" instructions are of the indexed form SX and LX; thus, all scans of the pattern may be processed by this sequence. Again, an all-zero operand indicates that the operand is taken from SSM 270, rather than from DSM 260.

Other types of expansion are also possible with the "shift-load" instructions. A "4 by 2" expansion, for instance, uses the LL2 or LR2 instructions to enter two adjacent bits from each of four scans into a single byte. A "2 by 4" expansion loads four bits from each of two scans into each byte, using the LL4 or LR4 instructions. A "1 by 8" operation uses LL1 and LR1 instructions to place eight bits of a single scan into each byte.

Table III shows a simple application of processor 200 to the control of machine functions by means of the external registers 280. Although the above described embodiment of the processor has been optimized for the execution of pattern-recognition algorithms, it is also capable of acting as a machine controller. Machine control, in fact, is conceptually not completely remote from the field of pattern recognition, since both are frequently performed in real time, both involve a large number of data operands each having a relatively small number of bits, and both must frequently evaluate complex logic functions.

The instruction sequence in Table III reads EXR32 281 into RR1 510, and branches to a statement labelled OFF if either the first bit is a "zero" or the fourth bit is a "one". Otherwise, RR1 510 is reset to "zero" and written back into EXR32 282. Various bits of EXR32 282 may be connected to various sensors and control circuits of the system 100, FIG. 1, or in other systems.

TABLE I

| No. 1 | L | PC | No. 30 | L | Z58 |
|---|---|---|---|---|---|
| No. 2 | CB | No. 57 | No. 31 | A | Y21 |
| No. 3 | A | MAF2 | No. 32 | A | Z21 |
| No. 4 | A | Z3 | No. 33 | A | Z42 |
| No. 5 | AC | Z64 | No. 34 | O | Z1 |
| No. 6 | ACX | K9 | No. 35 | AS | 0000 |
| No. 7 | ACX | K10 | No. 36 | LC | Z118 |
| No. 8 | AC | Z9 | No. 37 | AC | Z108 |
| No. 9 | AC | Z80 | No. 38 | OC | YB45 |
| No. 10 | AC | Z43 | No. 39 | AS | 0000 |
| No. 11 | AC | Z11 | No. 40 | LC | X246 |
| No. 12 | AC | Z23 | No. 41 | AC | Z49 |
| No. 13 | A | Y311 | No. 42 | OC | Z76 |
| No. 14 | AC | YL11 | No. 43 | AS | 0000 |
| No. 15 | LC | Z68 | No. 44 | L | Z72 |
| No. 16 | O | Z55 | No. 45 | O | Z40 |
| No. 17 | AS | 0000 | No. 46 | AS | 0000 |
| No. 18 | L | Z45 | No. 47 | LC | Z69 |
| No. 19 | O | Z21 | No. 48 | O | YR36 |
| No. 20 | AS | 0000 | No. 49 | AS | 0000 |
| No. 21 | L | Z74 | No. 50 | L | Y010 |
| No. 22 | AC | Y83 | No. 51 | O | Z55 |
| No. 23 | A | Z13 | No. 52 | AS | 0000 |
| No. 24 | O | Z58 | No. 53 | A | YB65 |
| No. 25 | AS | 0000 | No. 54 | S | T0 |
| No. 26 | L | Z49 | No. 55 | ZR | X'F2' |
| No. 27 | A | Z13 | No. 56 | BAL | CTBL |
| No. 28 | O | Z48 | No. 57 | BAL | INIT |
| No. 29 | AS | 0000 | No. 58 | | |

TABLE II

| No. 1 | SS | 0000 | No. 17 | SX | ZZ3 |
|---|---|---|---|---|---|
| No. 2 | SLS | 0000 | No. 18 | LX | A4 |
| No. 3 | SLS | 0000 | No. 19 | LL1S | 0000 |
| No. 4 | SLS | 0000 | No. 20 | SX | ZZ4 |
| No. 5 | SLS | 0000 | No. 21 | LX | A5 |
| No. 6 | SLS | 0000 | No. 22 | LL1S | 0000 |
| No. 7 | SLS | 0000 | No. 23 | SX | ZZ5 |
| No. 8 | SLS | 0000 | No. 24 | LX | A6 |
| No. 9 | LX | A1 | No. 25 | LL1S | 0000 |
| No. 10 | LL1S | 0000 | No. 26 | SX | ZZ6 |
| No. 11 | SX | ZZ1 | No. 27 | LX | A7 |
| No. 12 | LX | A2 | No. 28 | LL1S | 0000 |
| No. 13 | LL1S | 0000 | No. 29 | SX | ZZ7 |
| No. 14 | SX | ZZ2 | No. 30 | LX | A8 |
| No. 15 | LX | A3 | No. 31 | LL1S | 0000 |
| No. 16 | LL1S | 0000 | No. 32 | SX | ZZ8 |

TABLE III

| No. 1 | READ | EXR32 |
|---|---|---|
| No. 2 | CB | OFF |
| No. 3 | AMZ | B'10000000' |
| No. 4 | OMO | B'11101111' |
| No. 5 | ZR | 0 |
| No. 6 | WRT | EXR32 |

I claim as my invention:

1. A method operating apparatus in a digital data processor for altering the order in which said processor fetches a plurality of stored instructions from an addressable storage means, said method comprising:
   a. fetching a sequence of said instructions until a condition branch instruction is encountered at one address of said storage means;
   b. decoding said condition branch instruction, then storing a branch address specified by said condition branch instruction;
   c. incrementing said one address so as to produce a further address;
   d. fetching a subsequent one of said instructions in said sequence from said further address of said storage means;

e. executing a particular operation, said particular operation being specified by said subsequent instruction from among a plurality of different possible operations;

f. detecting the occurrence of a particular condition resulting from said operation, said particular condition being specified by said subsequent instruction from among a plurality of different possible conditions;

g. if said condition does not occur, returning to step (c), and h. if said condition occurs, substituting said branch address for said further address and fetching a further instruction from said branch address in said storage means.

2. A method according to claim 1, further comprising the steps of sensing a deconditioning signal produced from an instruction fetched by step (d); and thereafter inhibiting step (g) for all further repetitions of the latter step.

3. A method according to claim 1, further comprising the steps of sensing a masking signal; and thereafter inhibiting step (g) for at least some further repetitions of that step.

4. A method according to claim 3, wherein said masking signal is produced from an instruction fetched by step (d).

5. A method according to claim 3, wherein said masking signal is produced by stack storage means which receives results from, and supplies operands for, the operations executed by step (e).

6. A method according to claim 3, comprising the further steps of sensing an unmasking signal; and thereafter re-enabling step (g) for at least some further repetitions of that step.

7. A method according to claim 6, wherein said unmasking signal is produced from an instruction fetched by step (d).

8. A method according to claim 6, wherein said unmasking signal is produced by stack storage means which receives results from, and supplies operands for the operations ececuted by step (e).

9. Branch-control apparatus for a data processor, comprising:

an addressable storage unit for storing program instructions in a predetermined sequence, said sequence including a condition branch instruction specifying a branch address and a plurality of subsequent logic instructions, each said logic instruction specifying both a particular operation from a set of operations and a particular condition from a set of conditions;

a program address register for accessing said program instructions one at a time;

an incrementer for modifying said program address register according to said predetermined sequence;

a branch address register responsive to said condition branch instruction for receiving and storing said branch address;

a logic unit responsive to said logic instructions for performing said set of operations and detecting said set of conditions, said logic unit being further adapted to produce a condition signal for said particular operation whenever said particular condition specified by said each logic instruction is detected; and a status register responsive to said condition branch instruction and thereafter to said condition signal for transferring said branch address from said branch address register to said program address register, so as to alter said predetermined sequence upon a condition which occurs upon execution of any of said plurality of logic instructions subsequent to said condition branch instruction, and which is selected subsequent to said condition branch instruction.

10. Apparatus according to claim 9, wherein said predetermined sequence of program instructions includes a further instruction, subsequent to said condition branch instruction, specifying that said condition branch instruction is thereafter to be deconditioned, and wherein said status register includes deconditioning means responsive to said further instruction for thereafter absolutely inhibiting the transfer of said branch address to said program address register in response to said condition branch instruction.

11. Apparatus according to claim 9, wherein said predetermined sequence of instructions includes aa further instruction, subsequent to said condition branch instruction, and wherein said status register includes masking means responsive to said further instruction for thereafter temporarily inhibiting the transfer of said branch address to said program address register in response to said condition signal.

12. Apparatus according to claim 11, wherein said further instruction specifies that said condition branch instruction is thereafter to be masked.

13. Apparatus according to claim 11, wherein said masking means is responsive to a predetermined condition in said data processor resulting from the execution of said further instruction.

14. Apparatus according to claim 11, wherein said predetermined sequence of instructions includes another instruction, subsequent to said further instruction, and wherein said status register includes means for re-enabling the transfer of said branch address to said program address register in response to said condition signal.

* * * * *